US012769522B2

(12) United States Patent
Friddle

(10) Patent No.: US 12,769,522 B2
(45) Date of Patent: Oct. 20, 2026

(54) SYSTEMS AND METHODS OF PROMPT ENGINEERING FOR NEURAL NETWORK INTERACTIONS

(71) Applicant: PromptFlow Technologies LLC, Washington, DC (US)

(72) Inventor: Tyler Friddle, Washington, DC (US)

(73) Assignee: PromptFlow Technologies LLC, Washington, DC (US)

( * ) Notice: Subject to any disclaimer, the term of this patent is extended or adjusted under 35 U.S.C. 154(b) by 259 days.

(21) Appl. No.: 18/677,796

(22) Filed: May 29, 2024

(65) Prior Publication Data

US 2024/0403005 A1 Dec. 5, 2024

Related U.S. Application Data

(60) Provisional application No. 63/554,642, filed on Feb. 16, 2024, provisional application No. 63/504,767, filed on May 29, 2023.

(51) Int. Cl.
*G06F 8/35* (2018.01)
*G06F 8/70* (2018.01)

(52) U.S. Cl.
CPC .................. *G06F 8/35* (2013.01); *G06F 8/70* (2013.01)

(58) Field of Classification Search
None
See application file for complete search history.

(56) References Cited

U.S. PATENT DOCUMENTS

| | | | | |
|---|---|---|---|---|
| 2023/0112921 | A1* | 4/2023 | Cai | G06F 8/31 717/104 |
| 2023/0252224 | A1* | 8/2023 | Tran | G06F 40/56 715/256 |
| 2023/0325725 | A1* | 10/2023 | Lester | G06N 3/0455 |
| 2024/0248686 | A1* | 7/2024 | Garg | G06F 11/3668 |
| 2024/0256423 | A1* | 8/2024 | Zhang | G06F 8/71 |
| 2024/0296316 | A1* | 9/2024 | Singh | G06N 3/0475 |
| 2024/0311652 | A1* | 9/2024 | Kulkarni | G06N 3/045 |
| 2024/0330579 | A1* | 10/2024 | Saxena | G06F 40/106 |
| 2024/0378196 | A1* | 11/2024 | Lester | G06F 16/243 |

* cited by examiner

*Primary Examiner* — Qing Chen
(74) *Attorney, Agent, or Firm* — Nixon & Vanderhye, PC

(57) ABSTRACT

A self-improving code/prompt system (e.g., an operating system or a process layer) for generating and/or reusing code/prompt processes is provided. Code/prompt processes include a sequence of prompts for a model, such as an LLM and traditional logic (code) which augments the input/output to the LLM and orchestrates interaction with other third party processes. The system includes an interpreter for managing the execution of code/prompt processes and corresponding interactions with external models, system processes, a process database (e.g., of existing code/prompt processes), and other sources.

8 Claims, 20 Drawing Sheets

SYSTEMS AND METHODS OF PROMPT ENGINEERING FOR NEURAL NETWORK INTERACTIONS

CROSS REFERENCE(S) TO RELATED APPLICATION(S)

This application claims priority to U.S. Provisional Application No. 63/504,767, filed May 29, 2023, and U.S. Provisional Application No. 63/554,642, filed Feb. 16, 2024, the entire contents of each being hereby incorporated by reference.

TECHNICAL OVERVIEW

The technology described herein relates to machine learning systems. More particularly, the technology described herein relates to techniques for persisting and/or dynamically applying a pipelined sequence of prompts and logic that bridge gaps in model capability while creating a database for future use. Certain techniques herein relate to prompt engineering and/or sequence prompting of neural networks for large language models (LLMs) such as generative pre-trained transformers (GPT).

INTRODUCTION

Recent advances in large language models make it possible to perform increasingly complex tasks with accuracy and efficiency. Not only can you request information or ask for the model's understanding, but you can also use the model as a tool for creative tasks such as writing poems, stories, or even generating ideas for a research project. Despite these remarkable outputs, these models still have issues and inevitably hit stumbling blocks where they are unable to provide a desired response.

Prompt engineering is a technique that seeks to address such issues in interacting with LLMs and other models. For example, prompts may contain information that was not present in model training, instructions to avoid unwanted behavior, or specific phrasing that forces (or instructs) the model to provide the desired response when it otherwise wouldn't.

Increasingly, prompts may be paired with deterministic logic (e.g., traditional middleware, other software solutions, etc.) to enable ever more complex behavior. Technologies like Langchain and the like can allow for multi-agent prompting, retrieval augmented generation (RAG), chain of thought, and the like. Such techniques can be advantageous in that their usage can, in some cases, result in performance that exceeds that of, for example, additional fine tuning of a base model.

However, even with these tools, specialized prompts and prompts paired with deterministic logic remain challenging to construct and highly varied in their implementations. Both the prompt itself and the output of the given model often need to be heavily augmented to constrain the LLM to a desired set of responses. This process is laborious and the pipelines that emerge from it are highly varied. Ultimately some may not even use the LLM to provide the final response. For example, consider a process for a call center. In such an example, providing direct output from the model may be problematic. For example, what if the model provides incorrect information? Another option is to provide a set of validated responses, and then use the output of the model to search/select the best existing match. This additional level of complexity is often needed to provide a successful process. As solutions vary from one problem to the next, this has resulted in a landscape of highly varied solutions that typically lack any sort of baseline standardization. Further, with each solution, the lessons learned from construction of that solution are not always persisted. This can lead to siloed solutions which are domain specific and provide poor visibility into the actual efficacy of overall process.

The sheer volume of processes which are now possible to automate necessitates new technologies and new infrastructures in order to facilitate development of these processes. Accordingly, it will be appreciated that new and improved techniques, systems, and processes are continually sought after in this and other areas of technology.

SUMMARY

In certain examples, a system that provides prompt engineering technology is provided that bridges gaps in model capability by establishing a database of sequence prompts coupled with code that can be dynamically applied by an interpreter to enhance (e.g., greatly) model performance and manage model interaction. In certain examples, components of the system include a data model, a templated language, system processes, microservice(s), database(s), and interpreter(s). These components are used to create the novel system that couples prompt sequences with code so that they can be persisted, re-used, continuously improved, and/or dynamically applied to establish reliable pipelines of sequenced prompts.

In some examples, a system for accelerating code/prompt process development is provided. I In some examples, a system for decomposing code/prompt processes into common sub processes is provided. In some examples, a system for identifying and compensating for erroneous model output across model types and across different domains is provided.

In some examples, a system for storing decomposed code/prompt sequences in a flexible and re-usable manner is provided. In some examples, a system for generating database(s) of connected code/prompt sequences is provided. In some examples, a system that enforces standardization in code/prompt process development that enables these abilities is provided. In some examples, a system for developing model independent code/prompt sequences is provided. In some examples, a system that provides a templated language which connects multiple models and manages multi modal interactions is provided. In some examples, a system that performs validation, automatic prompt tweaking and produces error correction logic that compensates for error in model output is provided. In some examples, a system that produces code/prompt processes highly curtailed to a target model(s) yet also flexible enough to be applied to elsewhere (e.g., other models) is provided. In some examples, a system that permits rapid migration and upgrade of existing code/prompt sequences other models This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

Figure 1:
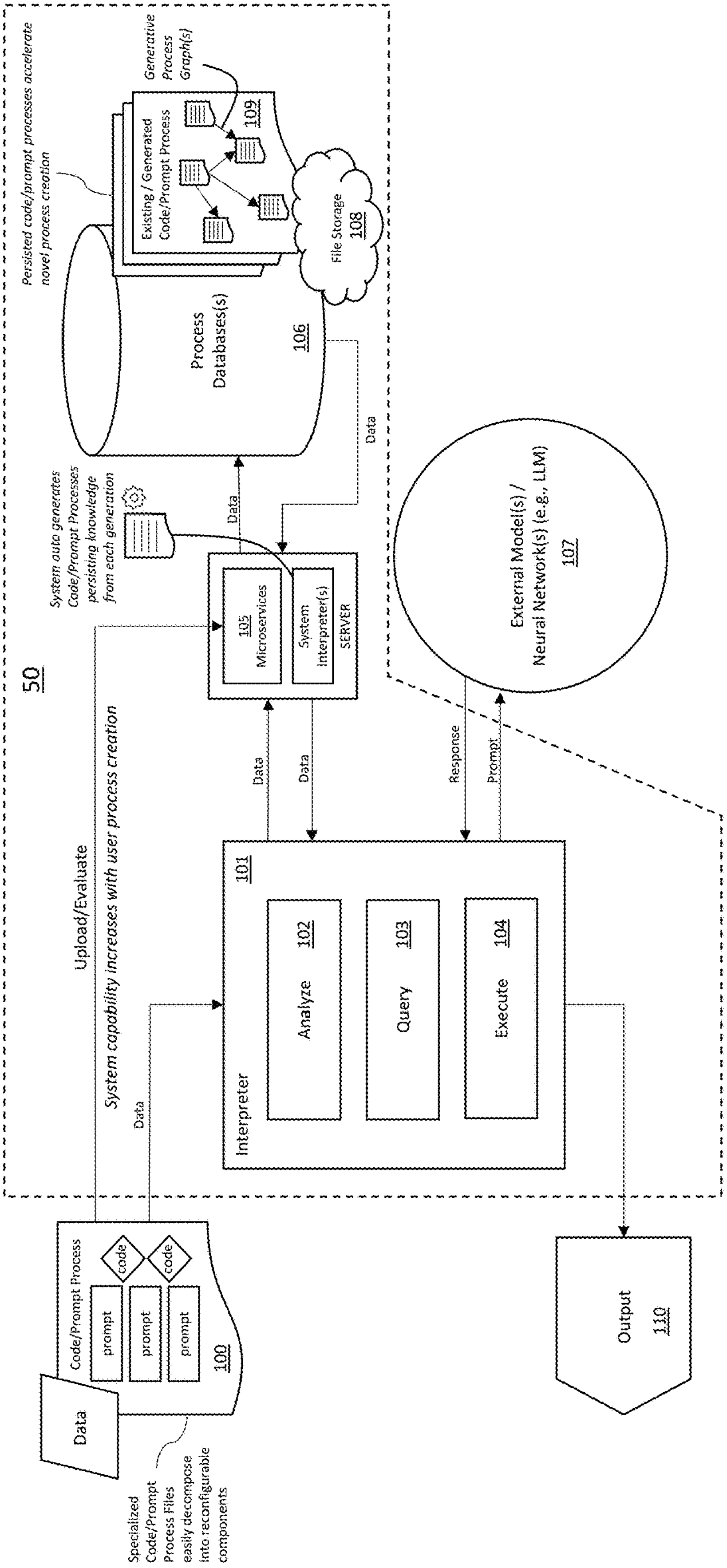
FIG. 1 is a block diagram for the system used in connection with certain example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Some reference numbers are reused across multiple Figures to refer to the same element; for example, as will be provided below, the analyze 102 component of the interpreter 101 is first shown in FIG. 1 and is also referenced and described in connection FIG. 2, and others.

Overview

The sections that follow include descriptions of the templated language, interpreter/processor run modes, querying and storage, continuous processes run by the microservices, database architecture and examples of system utility.

In certain examples, techniques that use code/prompt sequences as building blocks are provided. These code/prompt sequences are decomposed into steps/logical blocks and combined with cached knowledge to create a system of re-use where code/prompt sequences are dynamically applied during novel sequence construction.

To understand the effect that existing sequences have in reducing development time, consider dynamic programming where each subproblem is solved once, storing the solution resulting in faster runtimes. For example, the time complexity of the recursive solution to the Fibonacci sequence is O(2n), but using dynamic programming, it reduces to O(n).

The techniques discussed include a code/prompt sequence that is constructed for achieving a similar effect. For example, if a task can be broken down into n steps where each step takes time $t_i$ to complete, when r steps are re-used this will reduce the total time T by at least by some factor each time, e.g., $$T = \sum i = 1 \ \ldots \ \mathrm{n}t_i - \sum j = 1 \ \ldots \ \mathrm{ra}t_j$$

where α represents the efficiency gain from re-using a step, 0≤α≤1

Of course, it's important that there be semantically similar sequences that exist in the cache for this efficiency gain to be realized. Let βj denote the semantic similarity score of the j-th reused step, and Pj the probability that the correct step was selected. The efficiency gain can then be modeled as αj=βjPj. Hence, the total time T can be expressed as:

$$T = \sum i = 1 \ \ldots \ i - \sum j = 1 \ \ldots \ r(\beta jPjtj).$$

where βj ranges from 0 to 1, and Pj ranges from 0 to 1. In other words as the number of steps is increased the probability of some re-use occurring also increases. Considering a more practical example, if a user is developing "A process that generates personalized workout plans for clients", then the task could involve steps such as gathering client data, analyzing fitness levels, identifying goals, and matching exercises to the equipment. Another task could be seemingly unrelated, "A process that customizes travel itineraries for tourists based on their interests, budget, and available destinations." This task involves steps like collecting traveler preferences, analyzing budget constraints, identifying travel goals, and matching destinations to the interests. Despite the different contexts, both processes share common sub-steps such as data collection, analysis, goal identification, and matching. If these steps pre-existed in the database they could be adapted to solve either task. Of course, disparate processes can be far more aligned than this, suppose the user requests "A process that builds a mobile app" and the database contains "A process to build a website." The user requested process can be fully accomplished by subsuming the "a process to build a website" and then adding a single step that loads the url in a native webview. By breaking a user process into smaller steps, the techniques herein can increase the probability that there will be at least some overlap with cached processes. Re-use greatly diminishes the total development time, but it also has the added benefit of increasing the overall effectiveness, as cached processes can be heavily validated both by users and by the system.

It should be noted that the techniques described herein are not simply meant as a novel co-pilot for faster and better code/prompt sequence development—though this certainly emerges from it. Instead, the technology described herein represents a complete system architecture surrounding generative models where functionality (e.g., a large portion thereof) is constructed mainly via inference. Cached system code/prompt processes (pre-programmed) run continuously on a remote interpreter that populates a database with new sequences. These are then interacted with via a client's interpreter to enable new behaviors that the base model alone is not capable of. The user makes a request "Build me a website that generates music", the interpreter analyzes this request, queries the database, adapts and executes the relevant sequence(s). Because the system is comprised both by and for code/prompt sequences, inference largely enables much of the functionality. This has the added benefit of creating a system that scales as improvements to the underlying model are made. When updates to the base model negate existing code/prompt sequences (say when a website may now be generated in a single step versus generating css, js and html separately) system processes and the connected nature of the database facilitate a migration of the existing sequences—e.g., a new process node is added to the graph, and this shares the connections with the former website generator. What is manifest by all this is a system of code/prompt processes that supports multiple model interactions, can abstract sequences across iterations of model development, works in multiple domains and leads to an increase in the pace of automation that would not be possible in a less integrated environment.

In many places in this document, software (e.g., interpreter 101, analyze 102, query 103, execute 104, microservices 105, private interpreter 401, and protected interpreter 405, along with any other modules, software engines, services, applications, and the like) and actions (e.g., functionality) performed by software are described. This is done for ease of description; it should be understood that, whenever it is described in this document that software performs any action, the action is in actuality performed by underlying hardware elements (such as a processor and a memory device) according to the instructions that comprise the software. Such functionality may, in some embodiments, be provided in the form of firmware and/or hardware implementations. Further details regarding this are provided below in, among other places, the description of FIG. 20.

Description of FIG. 1

FIG. 1 shows an example architecture of the overall system 50 according to certain example embodiments.

System 50 operates by accepting/processing code/prompt processes 100 and generating output 110. In some examples, system 50 acts as a process layer to external models 107. In other words, instead of interacting with models 107 directly, users/systems and the like may interact with system 50 that provides a process layer to one (or two) or more external models 107.

System 50 receives code/prompt processes 100 that include prompts, logic (e.g., code or the like), and input data (e.g. files, variables, requirements).

Additional details of an example code/prompt process are discussed in connection with FIG. 5. However, briefly, the code/prompt processes 100 may be provided in a file, data structure, or other form that allows users to communicate or otherwise provide code/prompt processes system 50.

The prompts of the code/prompt processes 100 can be the input provided to a model (e.g., 107) that then provides a response. In some examples, and as described in greater detail herein, the system 50 may modify the prompt included in the code/prompt processes 100. In any event, prompts can be provided in a variety of different ways and types of data. Prompts can be any type of textual context or other data (e.g., images, audio, etc.) and can vary in relation to the model or models 107 that will be prompted.

While the prompts component of the code/prompt processes 100 is used to interact with one or more models, the logic component of code/prompt processes 100 is used to control, at least in part, how that interaction occurs.

Code/prompt processes 100 also can include data (or 'input data'—e.g., images, audio, text, json, etc.) that A code/prompt process (100) that is submitted to system 50 may then be provided to the interpreter 101. The Interpreter (101) translates the instruction (e.g., which may include the prompt, logic/code, an input function that modifies data of the data object, configuration that connects external systems or controls interpreter behavior, etc.) into both messages that are sent to configured neural network(s) and/or to other local or remote CPU/GPU processors. The interpreter 101 then may initiate thread(s) of execution that process the code/prompt processes.

The interpreter 101 includes and/or executes multiple sub-processes to perform various operations, these include: 1) analyze (102); 2) query (103); and 3) execute (104). Each of these may be provided within their own separate process space or may operate within the process space of the interpreter (e.g., on a separate thread of execution). In some examples, each or any of analyze 102, query 103, and execute 104 may be a module of the interpreter (which may also be a module).

Analyze 102 generates predictive runtimes and extrapolates the execution of a provided code/prompt process. In some examples, analyze 102 also provides debugging functionality for code/prompt processes and supports other sub-processes.

Query (103) communicates with microservices (105) (described in greater detail below) that is running externally on a server. Query 103 packages or otherwise transforms a user submitted code/prompt processes into queries that are submitted to a database (106). Note, returned data form these queries can then be added to or modify the code/prompt processes.

Execute (104) executes code/prompt processes and is used to communicate with external models such as neural networks 107 (e.g., LLMs, image generators, image classifiers, other neural networks, and the like). Execute 104 is provided to manage the input (which it may also augment in some instances) to the models (e.g., the prompts) and handle the output from the models and correspondingly update a data object (e.g., data object 513 that is discussed herein) that is associated with the executing code/prompt processes.

It will be appreciated that the system discussed herein can be configured to communicate with multiple different external models or neural networks 107. Indeed, the given processing associated with a provided code/prompt processes and/or prompt or other processing described herein, the system 50 may communicate with multiple different target or destination models in order to receive output that is used in generation/processing of a given code/prompt processes. Thus, for example, models and other neural networks may include GPTs, image generators, image classifiers, and other types of neural networks or models. Examples of using multiple different models are discussed below.

Microservices 105 (which may be provided a separate computing instance or server) communicate with a database 106 and the interpreter 101. Microservices include functionality to retrieve applicable external code/prompt processes (109) from the database. These retrieved code/prompt processes 109 may then be incorporated (e.g., dynamically) and/or applied to the on-going execution of a code/prompt processes 100 that had been supplied by a user.

As discussed elsewhere herein, database 106 is used to store code/prompt processes. In some examples, stored code/prompt processes may be stored as embeddings in order to facilitate search operations. In some examples, metadata regarding the code/prompt processes is also stored in the database and is used in connection with applicable searches that may be performed. The metadata can include, for example, runtime information associated with the code/prompt processes including, 1) a number of times the code/prompt processes has been run/executed; 2) A number of prompts needed for successful execution 3) the author or authors of the code/prompt processes; 4) and additional data as needed.

Long term file storage 108 is used to persist prior model output and raw files.

Output (110) is returned from the system 50 to the requesting user (e.g., the client computing system that submitted the initial code/prompt processes). The output may be communicated back to the user when the user's code/prompt processes has been fully executed by the interpreter 101 or a maximum number of requests (e.g., to the model 107) for that code/prompt processes and/or user has been reached. In some examples, and as discussed in greater detail herein, the output may cause the user to modify one or more aspects of the initial code/prompt process 100 that may then be resubmitted with the changes/updates, etc.

In some examples, when the user has created/submitted a code/prompt processes, the system 50 facilitates an upload/evaluation mechanism and if the code/prompt processes passes validation it's updated to the database for future re-use.

Figure 2:
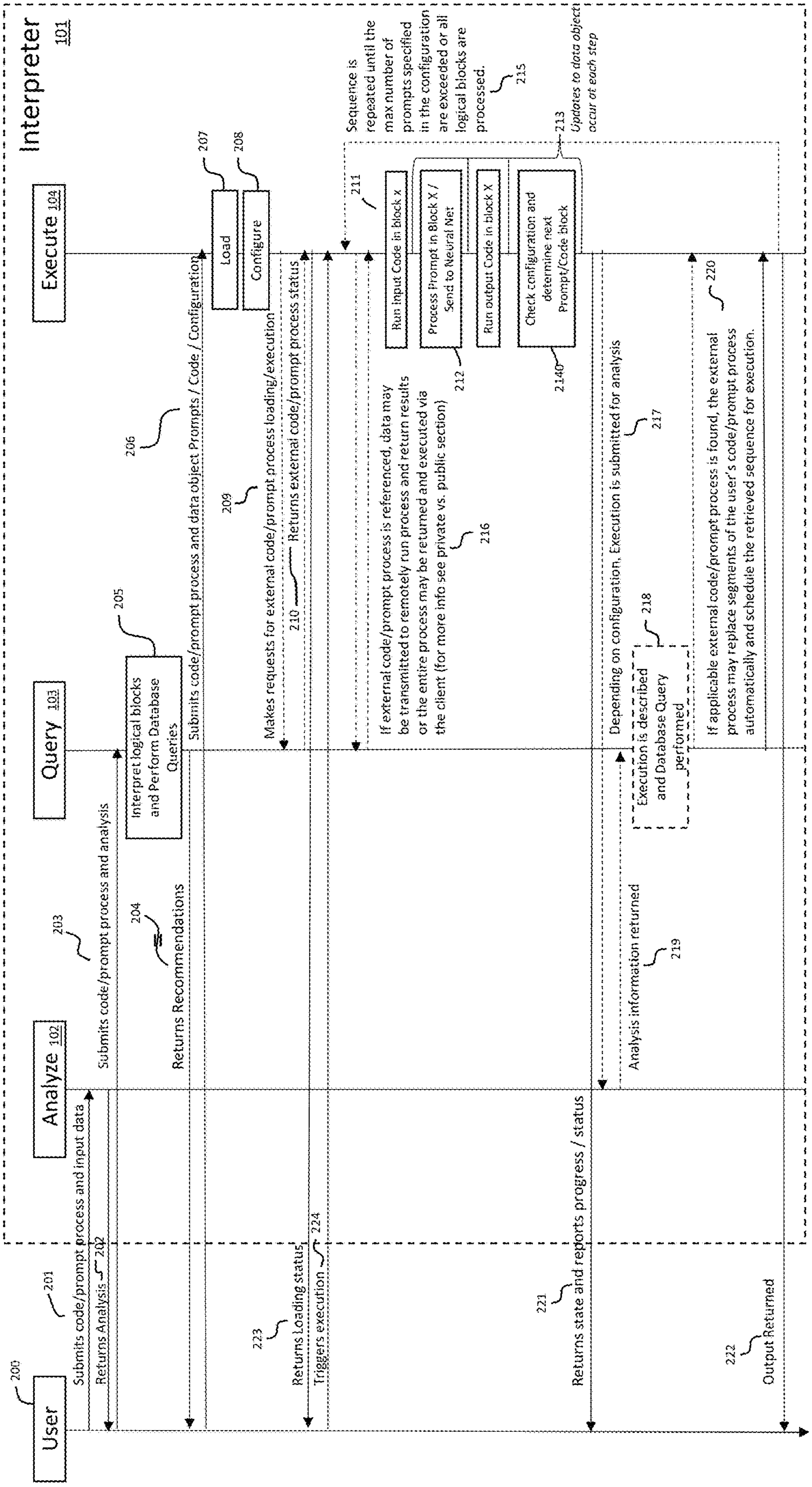
FIG. 2 is a signal diagram that shows the interaction of the different sub-processes of the interpreter of the system that is shown in FIG. 1 according to certain example embodiments.

Description of FIG. 2

FIG. 2 illustrates the interaction of the different sub-processes that may be included in interpreter 101 and how a user's/client's code/prompt process is handled within the system 50. In some examples the interpreter may be termed a "processor" (which is different from processors 2002 discussed in connection with FIG. 20) or an "interpreter processor" for code/prompt processes or the like. As noted in connection with FIG. 1, functionality in the interpreter 101 can be segmented into 3 main domains, Analyze, Query, and Execute. As also noted above, each of these may be provided within their own process space and/or module (e.g., the analyze module, the query module, and the execute module)

'Analyze' provides insight to the client and to other processes. It is used to facilitate debugging as well as returning useful information on the execution of one or more code/prompt processes.

'Query' manages the interaction of the interpreter 101 with the database, depending on the mode the interpreter is configured for these interactions happen either prior to execution or at runtime.

'Execute' performs the bulk of the work in the interpreter 101 by processing each logical block or section of a code/prompt process (there is typically a sequence of these) and managing the interaction with one or more targeted neural networks. Together these components of the interpreter 101 enable it to manage the interaction with the underlying LLM/neural network and other system components.

The interpreter 101 can have two different modes-'manual' and 'automatic'. In manual mode, a code/prompt process and the user's initial query/data is submitted to the interpreter 101 which executes only the instructions the user provided as part of the code/prompt process. However, in automatic mode the interpreter 101 may apply an existing code/prompt process from the database 106 to the user's submitted code/prompt processes or other request. In some examples, it is also possible to run in a hybrid mode where a prompt/code process is provided along with a query and specific sections are configured to run in 'automatic'. In some examples, each section may be assigned an automatic or manual label and thus assignment may be part of the file that defines the code/prompt processes. In FIG. 2 areas that relate to automatic and hybrid mode are signified by a dashed line.

Turning more specifically to FIG. 2, an example of messages that are exchanged in the system 50 of FIG. 1 for each of the operations of the interpreter 101 (e.g., pre-processing of a code/prompt process, loading and configuration of the same, execution, etc.).

As shown in FIG. 2, interaction with the system 50 is initiated by the User (200) who submits, at 201, a code/prompt process (e.g., a prompt sequence, code, configuration, input data, etc.) to interpreter 101 that is passed to the 'Analyze' sub-process (102). In some examples, test data which simulates the model response may also be provided by the user. This data can be used by the analyze process 102 to simulate model response and assess that the code component executes as expected.

From the analyze process 102, an analysis file is produced (at 202) which contains estimates on runtime (e.g., how many prompts were needed to execute the provided code/prompt processes (202)), and what is the likelihood that the code/prompt processes will successfully complete. Once the analysis step concludes, the input data, the code/prompt processes, and the generated analysis file are sent to the query process (103) for processing.

In some examples, the submission to the query process is performed from the user 200 to the query process 103. In other examples, the submission of the input data, the code/prompt processes, and the generated analysis is communicated from the analysis process 102 to the query process 103 without first being returned to the user 200.

Next, at 205, the query process 103 breaks up these files into logical blocks (e.g., the logical blocks as discussed in connection with FIG. 5) and describes each prompt, code, and/or configuration segment by its input, output, and runtime statistics based on the analysis file. Each of the logical block segments are processed by an encoder (discussed elsewhere herein) to generate an embedding. The embeddings allow for queries to be executed against the database (107) to find similar logical blocks. Such queries can use mathematical operations like cosine similarity or the like. This allows the embeddings generated from a code/prompt processes and/or those stored in the database to be compared. This then allows the system to efficiently find a set of existing code/prompt processes (which may also be referred to "pipelines" herein) that appear similar to the logical blocks of a user's code/prompt processes. These similar code/prompt processes are then sorted by their projected runtime and returned to the user at.

With the returned data, a user may now choose to reconfigure their code/prompt process (from 201) to use the code/prompt processes from the database. This may include updating the segments of their configuration/code with references to these additional code/prompt processes.

Once updated, the user's code/prompt process may be ready to be submitted, at 206, back to the interpreter 101 and the execution process (104).

The techniques described in FIG. 2 are emblematic of a typical workflow in the system 50 prior to execution—e.g., when the user is crafting their code/prompt process.

Alternatively, or additionally, users can draft pseudo code that roughly describes the desired input and output of each logical block and submit these to the database which will return existing pre-defined pipelines. Using this type of approach may be beneficial as it can allow for faster and/or simpler generation of a code/prompt processes than coding one originally from scratch. Similarly, the code/prompt processes in the database come with independently verified statistics that allow a user to be provided with information on how the code/prompt processes will perform during execution. Accordingly, a user can leverage the database to create reliable (e.g., perhaps more reliable than from scratch) code/prompt process to quickly develop their own generative content using the LLM(s) 150. These pre-execution steps, analysis, and database querying/recommendation(s) can be called independently by a user throughout the process of constructing a code/prompt process.

Returning to FIG. 2, once the user has completed their code/prompt process, the code/prompt processes and input data is submitted to the execute process 104. When this occurs, the procedure (e.g., each logical block including its code and prompts) is loaded at 207 by the execute process (104). Noted that in some examples one or more logical blocks can be loaded (e.g., two or more).).

Next, at 208 model configuration and configuration of the interpreter now occurs. This includes, for example, specifying the type of runs that will be performed and what external neural networks will be used throughout the execution of the code/prompt process.

As mentioned in connection with the automatic mode, this may include, at 209, querying the database. The external code/prompt processes are retrieved at 210 and may be stored into internal memory for access by the interpreter 101. This may include undergoing a load/configuration sequence for the user's code/prompt processes. In certain examples, if the external code/prompt processes is not public (discussed below) in the database, e.g., it is a private code/prompt processes, then the code/prompt processes may not be by the interpreter for the user's code/prompt processes. Instead, it may be loaded by a private interpreter (e.g., protected) residing on the server. Such features are discussed in greater detail below and allows for remote execution of a code/prompt processes so as not to expose the complete logic of the sequence of private or protected code/prompt processes.

Once the interpreter 101 loads the indicated code/prompt processes and the configuration of that code/prompt processes is completed, a message may be communicated back to the user at 223 indicating the status of the interpreter. At 224, the user can then trigger execution of the code/prompt processes.

Each logical block of the code/prompt processes may now be ready for execution. The execution of each logical block of a code/prompt process can include preparing the prompt within that block (at 211) for execution, executing the prepared prompt (at 212), obtaining the output from running of the prompt, and then determining the next prompt to execute (at 214).

In some examples, when execution of the code/prompt processes occurs or is triggered, configuration information that references external code/prompt processes and/or additional models initiates a communication between the query process and the execute process where these are, at 216, configured and/or retrieved. The retrieved configuration information may then be integrated into the execution of code/prompt processes at 211.

As part of the execution process at 211; any parameters in the prompt may be modified by values contained in the data object. For example, the prompt in the prompt sequence may be, for example, "generate me a website {topic}" and the data object may contain a parameter called 'topic' which is set to "for a meetup group that enables voting on a location" (the value). In this scenario the prompt would become "generate me a website for a meetup group that enables voting on a location" and this would get submitted as input to the LLM.

Once the input logic (e.g., input code segment of the logical block-see 511 in FIG. 5) is executed via 211, the prompt may be modified by the data object (e.g., via parameters) and submitted to the LLM at 212. At this step, the LLM produces a response, and this output is returned to the execute process 104 and stored in the data object that is associated with the code/prompt processes.

In some instances, configuration inside of the user's code/prompt process may additionally redirect the output from the LLM to a code block which performs additional logical operations on the output before updating the data object.

In some examples, custom code segments may also be called prior to the prompt (note it may be necessary to modify the prompt via some specific logic—but this is less common than modifying the prompt via the data object but is configurable). When the code finishes executing the modified data object is returned from the execute process 104 and the data object is successfully updated. The updating in this manner can occur prior to submission of a prompt (e.g., to control/update/modify the prompt in some manner) or may be performed after a response is received from a model. In certain examples, the data object is carried throughout the execution of the code/prompt processes and functions as a data structure or the like for storing data as the logical blocks are being executed).

Now that the prompt has been sent to the LLM and the response has been processed and stored, the interpreter determines the next logical block of the code/prompt process that should be executed at 214. This determination may additionally pass to a code segment which enables customization of how this determination is made or that it may be explicitly indicated in the user's configuration at 214. In some examples, this enables a variable (e.g., highly variable) execution where the non-deterministic output of the LLM governs the sequence. The code provided by the user within the code/prompt processes can provide a "guardrail" on the output from the LLM. For example, the prompt may be something like "Based on the output from question 1 select the most appropriate next prompt in this sequence [prompt_1, prompt_2, prompt_3, prompt_4, prompt_5, prompt_6], respond only with the prompt name", the code may then parse the output, re/asking the question if the model responds with anything other than a prompt name (e.g., the name of that particular element in the sequence of prompts). Once a prompt_name is returned by the model that prompt name may be processed by additional logic to identify the next logical block (e.g., at 214) in the code/prompt processes that should be executed. As noted, this can lead to a non-deterministic execution where the precise execution is not known and may be only loosely controlled (e.g., because the response from the LLM/model may vary). The "next logic" may also terminate the execution at this stage if a satisfying outcome has been achieved.

Next, at 221, information may be provided back to the user indicating the status of the on-going execution with statistical information. Note that this processing relates to an interpreter that is executing the code/prompt processes provided from/for a user/client and not a private interpreter running on a server (e.g., as status information may not be returned from the private interpreter and/or be redacted).

In some examples, following the status information being returned, an optional step occurs in the automatic mode. Steps (217, 219, 220) perform an additional analysis/query step where the information on the execution so far is then used to generate recommendations for additional code/prompt processes that are relevant. In certain examples, this aspect is advantageous in situations where the prompt dramatically differs from the initially provided prompt.

More specifically, at 217, details/results of the execution of the code/prompt processes are provided back to the analysis process 102 that analyzes the data and, at 219, returns a result. The execution analysis may be provided to the query process 103. The query process takes the resulting analysis and then queries the internal database 106. If an additional/applicable code/prompt process is found as a result of that query, then it is returned to the execute process 104 and the originally provided code/prompt processes is updated based thereon.

Once status information has been returned and any database queries needed are performed, the process proceeds to the next logical block and repeats itself (215), repeating steps *216, 211, 212, 213, 214, 221, *217, *219, *220 where *indicates the steps associated with automatic mode. This execution continues in this manner until all the logical blocks of the code/prompt processes are fully executed, or the max number of prompts the user has allotted for the code/prompt processes has been exceeded. Once a termination condition is reached the output from the procedure is returned to the user at 222. In some examples, any or all of the runtime history, model responses, queries, and/or data object may be returned to the user at 222.

Successful code/prompt processes execution can be difficult, finnicky, or otherwise troublesome to configure. For example, prescriptive code elements can lead to dependable output, but overly prescriptive code elements may lead to a uniform response. Accordingly, a large amount of trial and error can be necessary in constructing an effective prompt/code pipeline that balances the non-deterministic elements effectively with their deterministic components. Certain example embodiments, such as system 50 and its components, aim to address at least some of these difficulties.

As users develop code/prompt processes, interactions with the interpreter enable analysis, debug/testing, and the like to be performed. Further, querying of a knowledgeable database of historical prompt sequences that greatly accelerate their development. Additionally, as the interpreter handles the operational logic, a developer or the like can decrease the amount of configuration they would need to fully develop a prompt sequence pipeline. The following provides further explanation of the functionality of FIG. 2:

200 Representative of the user of the system, the external entity interacting with the interpreter. 200 may represent the computer or other device being used by the user.

201 Submits code/prompt process and input data for analysis, inside the interpreter 101 is logic designed to execute the code/prompt process with simulated responses (derived from cached responses) from the underlying model. This data can either supplied by supplied by the user our generated if an external model is configured to perform this. Runtime information and simulated output enable the user to test the code segments and prompts together making it easier to understand where the issues between the two working together may occur and resolve them.

202 Returns analysis, the interpreter runs the code/prompt process with the input data and returns a file containing an analysis of the user's code/prompt process.

203 The analysis and the user's code/prompt process are submitted to the Query portion of the interpreter where each logical block (see e.g., 515) is formed into a query which is sent to the microservices 105, which queries the database for applicable code/prompt process.

204 Recommendations for applicable code/prompt process in the database are returned that the user can now update their code/prompt process with.

205 As mentioned in 203 and 204, if the user wants to get recommendations for potential applicable code/prompt process this process would package the user's data, the analysis, and the code/prompt process and send it to the microservices and getting a list of recommendations in return—this section denotes that sub-process.

206 Before the user can execute their code/prompt process they first can configure the interpreter to know how it performs. Accordingly, relevant data is submitted to the Execute process of the interpreter to both load and configure the user's code/prompt process.

207 Denotes the Execute sub-process of loading that occurs when the user submits their input data and code/prompt process.

208 Denotes the Execute sub-process for configuring the interpreter, determining whether the interpreter should automatically apply code/prompt process or strictly follow the user's instructions.

209 If an external code/prompt process is referenced, then the code/prompt process will either be returned in full (if it is public, see 402) replacing the sections that it is associated with, or, alternatively, if it is private (see 403) an external interpreter will be configured and load the externally applicable code/prompt process. This prepares the code/prompt process to be executed when the time is appropriate.

210 Status information as to the external interpreter is returned from the Query process.

223, Following 210, status of the Execute process is returned to the user, indicating whether execution is ready.

224 User executes the code/prompt process that has been loaded.

211 Unless the code in the executing code/prompt process modifies the input or configuration of the first logical block (see 515) the prompt portion of the first logical block in the code/prompt process (503) will be modified by the variables in the data object and transmitted to the LLM (or whatever external neural network is designated in the configuration of the logical block (see 501)).

212 Output from the neural network is both stored automatically in the data object (see 513) or if a function in the code portion of the code/prompt process is specified the output is redirected there. This may be typical as the output from an LLM may be variable and need to be correctly parsed. (It should be noted that each logical block permits modifications of the data object via functions both as input and output, e.g., the data object is modified by each step/aka logical block).

213 As mentioned, the data object typically updated in the code can also automatically store the output in a reserved field. This can be helpful for automatically producing a file with characteristic output/needed by both analysis and the validation process.

214 This step denotes the portion in the execute process where the code or the code/prompt process configuration set the next logical block in the process. As noted herein, Logical blocks may of the configuration, templated prompt, and code that handles inputs/outputs.

221 At this point information about the execution so far is surfaced (e.g., communicated) to the user.

217 If the execute process is running in Automatic mode the users code/prompt process may modify its prompts enough that it necessitates additional analysis. In such a case, state information is transmitted along with the history of prompts to the Analyze process and analysis information is returned.

219 Analysis information is returned.

218 If the execute process is running in Automatic mode a query is communicated to the microservices with information about the analysis and the execution so far in order to generate a query for the database to retrieve existing applicable code/prompt process (e).

220 If in Automatic mode and an externally applicable code/prompt processes is found (and public) it will be returned and inserted (or replace the relevant sections) in the user's code/prompt processes. In certain example embodiments, runtime behavior can be configured by the user via one or more interpreter settings and/or dynamically assigned via configuration inside the code/prompt process.

215 At this point the next logical block begins execution, and the process repeats itself until the maximum number of allotted prompts is exceeded or all logical blocks have been completed.

216 If externally referenced code/prompt process (e) have been explicitly configured, then the data object along with configuration information is transmitted to the query process which sends the objects to the microservices. The data object is then submitted to an external interpreter and a private code/prompt process is executed updating the data object with the results. The data object is then sent back to the microservices which then return it to the Execute process.

222 Output from the execution is returned.

Figure 3:
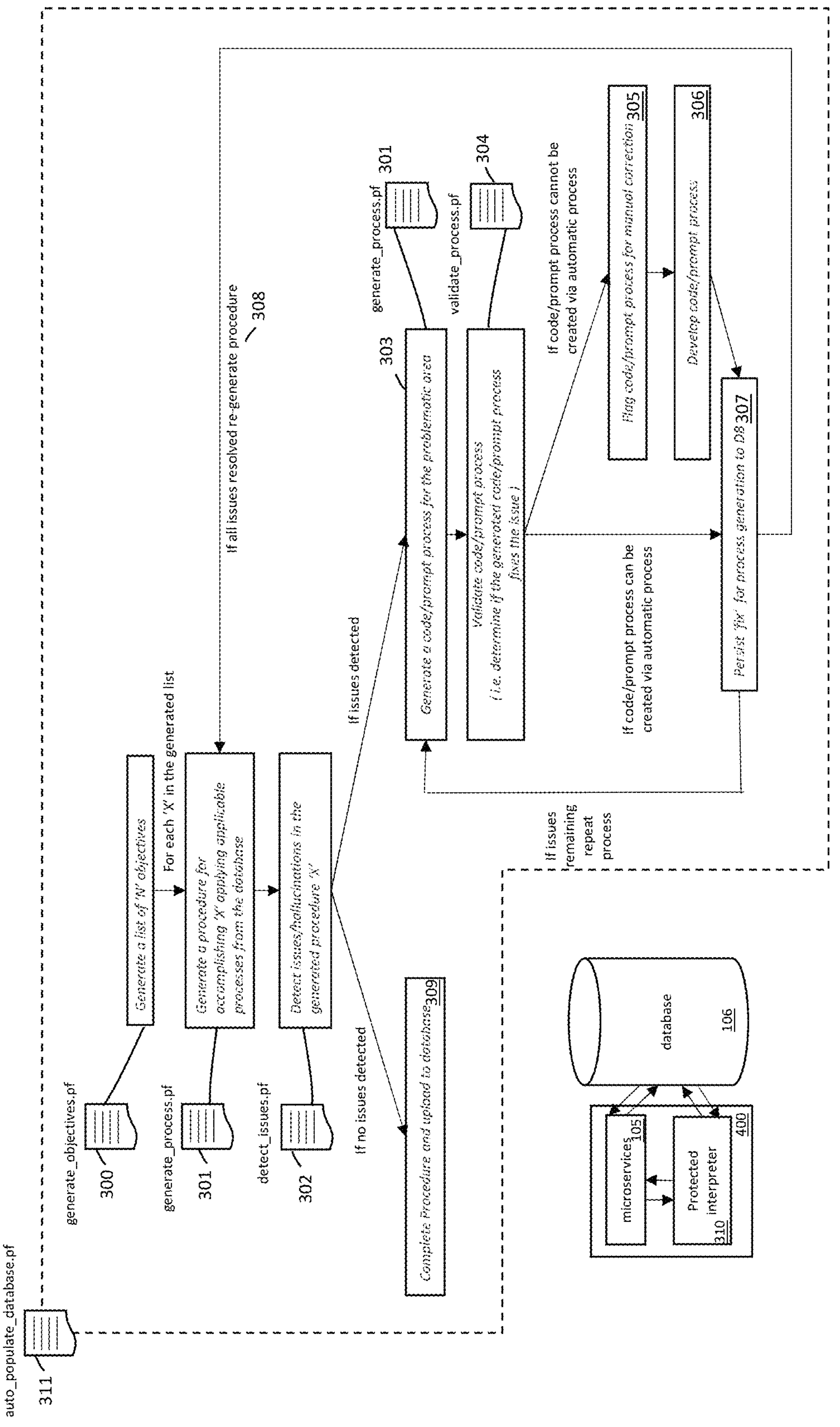
FIG. 3 is a flow chart that illustrates one of the protected processes that run independently on the server(s) of the system shown FIG. 1.

Description of FIG. 3

FIG. 3 illustrates the algorithm for auto-populating the database (106) implemented via a code/prompt process that runs as one of the system/protected processes (which are discussed in connection with, for example, FIG. 4) and on the server (400). It will be appreciated that other types of operating systems, different processes can run with different levels of access. Accordingly, in certain example embodiments, system/protected processes may denote the highest level of privilege as these processes typically interact (e.g., directly) with the process database (106) and other system wide components.

The algorithm depicted in FIG. 3 is designed to run over the lifetime of the server. In certain examples, the algorithm depicted in FIG. 3 can be configured on a periodic cycle and/or triggered under configurable conditions. It is designed to auto-populate the database with large sets of reusable procedures that are expected to be common among user requested processes. As such, the servers (400) are expected to be somewhat domain specific though some common information may be shared across them. In certain example embodiments, it should be noted that there is a universe of user process requests, but the less variable these requests are from each other, the higher the likelihood a user process request will successfully complete. Ideally, by the time a new process is requested very little of the process will be constructed at runtime and instead data may simply be retrieved from the database.

The purpose of auto population is to build and cache as much functional knowledge ahead of time so as to increase this likelihood of re-use. Key to this is that topics requested in the algorithm closely align with expected user requests. For example, if the server was focused on processes involving websites, then different aspects of web layout and website composition might be emphasized.

Figure 14:
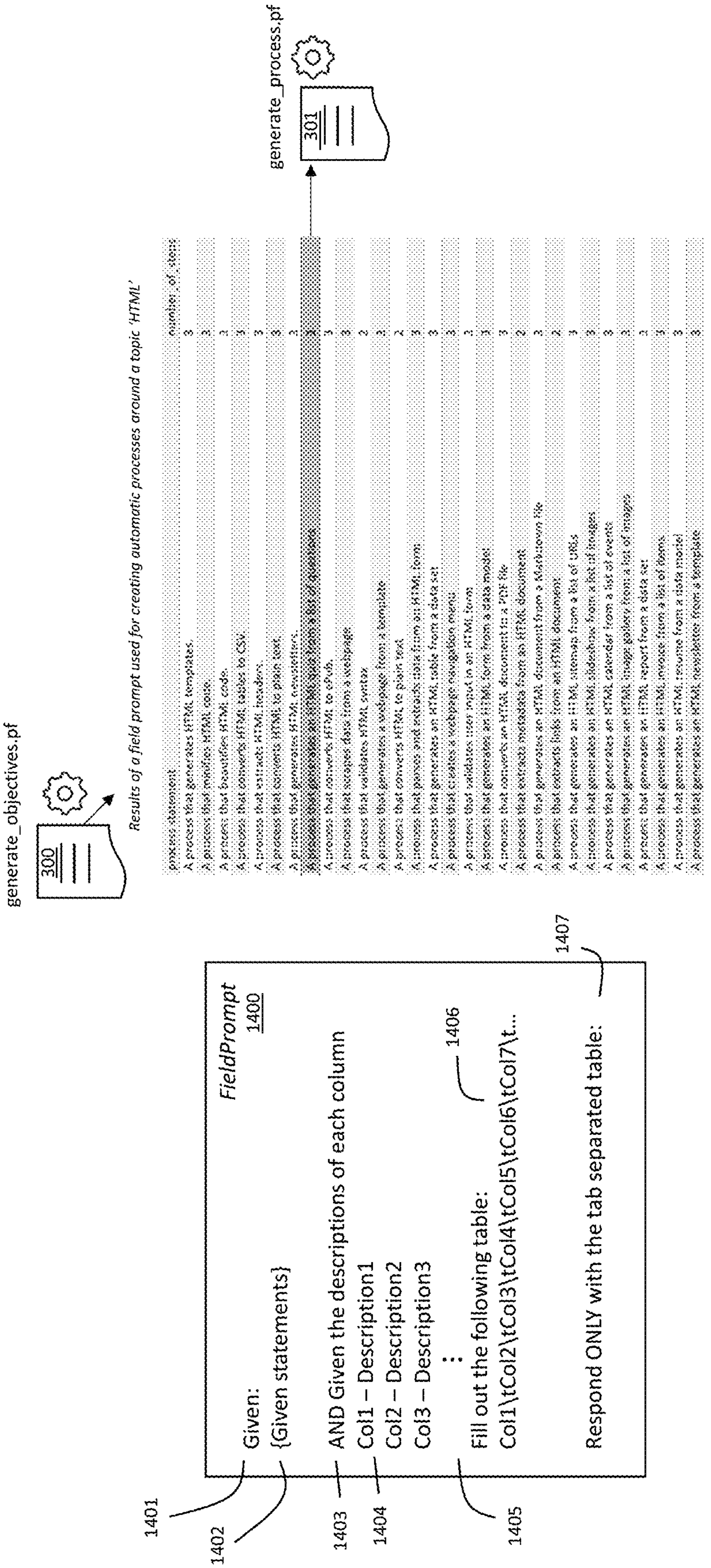
FIG. 14 illustrates additional examples of prompting techniques that facilitate various system processes.

Once a topic has been decided on, a large set of objectives/process statements can be created around it (depicted in FIG. 14). Each of these are then passed to a generate_procedure code/prompt process (301). This then attempts to generate a procedure for each objective, specifics for this are provided in FIG. 15. As each thread of execution proceeds each generated procedure is scrutinized for factual errors, logical errors (e.g., code), omissions, undesirable actions, unnecessary steps, repetitions, and/or model hallucinations. If no issues are found and the procedure is successfully generated and validated, then the new code/prompt process will be added to the database. If however an issue is found, the step where the procedure generation failed will be flagged and the process for the particular procedure generation paused until the issue can be resolved. As each procedure is produced, more and more of these 'stumbling blocks' will be encountered and the most common of these will be prioritized.

Fixes for each of the encountered issues then proceed, first an automatic generation process is attempted around the specific point of failure. If this is successful, process generation is re-attempted and the interpreter automatically applies the fix when the failure point is re-encountered. Note, however, if the interpreter fails to apply the newly constructed fix (e.g., Query fails to return the process, this provides another opportunity for automatic system improvement-a process is started that attempts to correct the metadata in the database.) It should be noted that equally important to having a successful procedure in the database is ensuring that it can be correctly applied.

If the automatic process fails to generate a fix for the failure point (e.g., cannot be validated), then the issue is flagged for manual correction. Several strategies are employed to avoid this, external knowledge sources are leveraged to provide in context information, high sampling and voting is used to select the best of many outputs, but at some point, if automatic methods fail then a manual process must be constructed.

Gradually, both by manual or automatic effort, gaps in model capability are filled in enabling the system overall to improve. Eventually the number of successful processes that can be automatically generated began to exceed that number which need manual correction. This inflection point occurs either when enough sophisticated processes are added to the database or when enough developers are actively participating in the system. Because the system can both re-use complex processes and persist the lessons learned between manual and automatic process generation, with each iteration of the cycle more and more 'know how' is persisted and producing higher quality prompt/code processes becomes produced.

Each process when active in the database now enables the system to do one more thing that it couldn't before. As this continues, further capability can be added (e.g., relatively quickly) to the system. Each time the process for auto population repeats all applicable historical knowledge can be reapplied.

Figure 9:
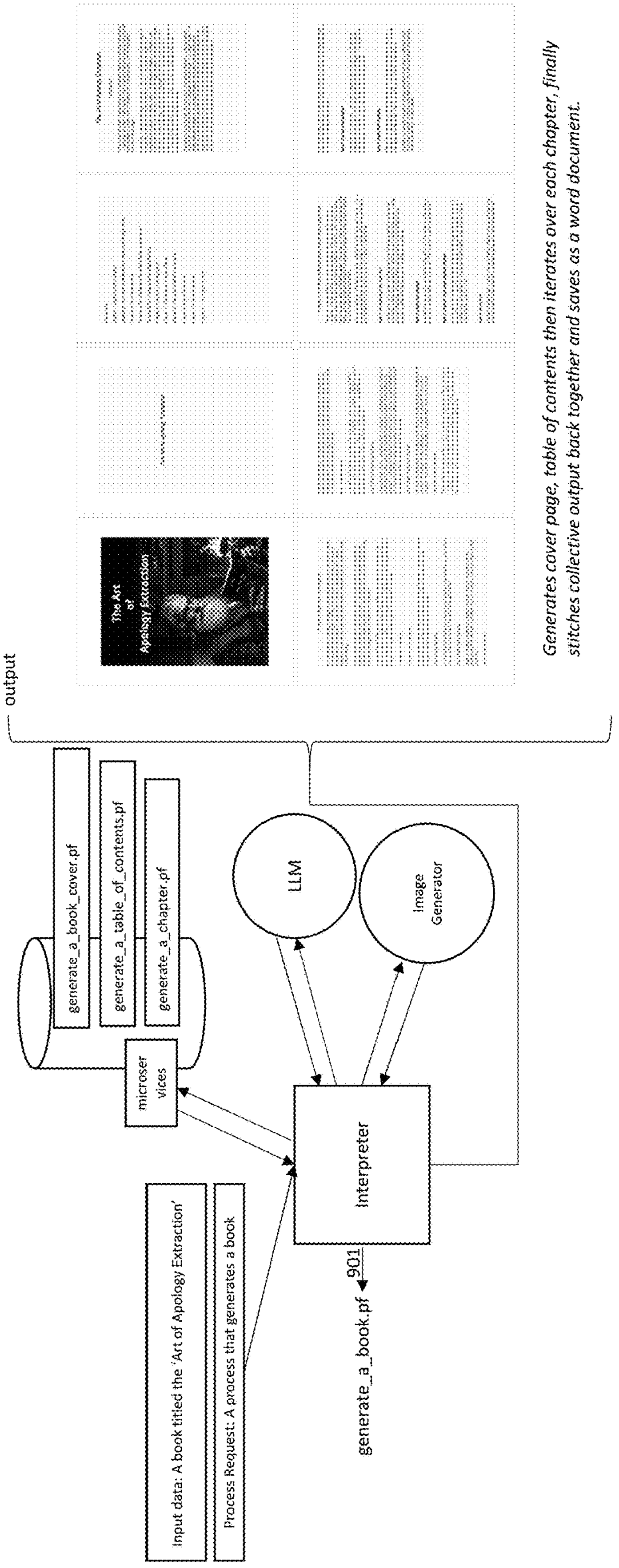

Over time, an extensive knowledge graph (e.g., as shown in FIG. 9) of code/prompt processes are generated from this protected process. Further description of the elements in FIG. 3 includes the following:

At 300, generate_objectives.code/prompt processes is a process stored in the database that is called by the microservices which generates a set of objectives. An example of an objective may be, for example, to generate desirable web apps, generate a board game, generate a technology, generate a better code/prompt process, etc. More specifically, the generate_objectives.code/prompt processes can be used to (in the website example) generate a list of desirable websites with different layouts and respond with the format: website name, website description, layout type. This element is periodically run by the protected interpreter and kicks off a process "N" in FIG. 3 is the tasks/objectives (e.g., a list) generated from a prompt. X each a given item in this generated list. In some cases, the generate_objectives.code/prompt processes may be only internally provided/accessible; and in others it may be exposed via, for example, microservices. In some examples, the generate_objectives.code/prompt processes may communicate with external (or internal) LLMs in order to generate the items in the objectives.

At 301, generate_process is a code/prompt process stored in the database (more detail in FIG. 15) that is called by the microservices which generates a procedure for each of the objectives that have been created so far by generate_objectives (Note: an objective list may also be manually supplied in some settings but mostly it will be auto-generated). In some examples, generate_process is triggered to run by the microservices when new objectives are produced or significant updates to the database occur or when it is requested by a client. An example of the input to generate_process is a process statement, for example "generate a procedure for changing oil in a snow mobile."

In certain examples, to assist the LLM in generating procedures, the pre-prompt context can be augmented with information relevant to the task. For example, in the case of changing the oil in a snow mobile example, this may include excerpts from the owner's manual or previously generated procedures with similar objectives. It will be appreciated that identifying relevant information either through a web search and/or database search and supplying it to the LLM in a pre-prompt context increases the likelihood that the LLM will utilize the information and provide a correct response. To further enhance this, low-rank adaptation models (LoRAs) and finely tuned versions of an underlying LLM can be applied to improve the performance of generating an effective procedure in different respective domains (e.g., vehicle maintenance, website generation, cooking recipes, etc.). Thus, for example, a base model (e.g., GPT-4) can be switched out/augmented with different domain specific models based on the specified objective (or a newer model—e.g., GPT-5). This type of approach of selecting a specific model based on the objective or the like may lead to better results. In some examples, the model switching may operate automatically—e.g., being facilitated by an embedding comparison of the generated objective to a descriptive string about the model's domain knowledge. This type of technique enables the process to shift to an "expert" in a given domain whenever it is needed. In some instances, a training process to create a new expert may also be initiated by generate_process. Typically, this is accomplished via a web search and LoRA (e.g., a kind of lightweight fast fine tuning of a model).

It will be appreciated that the data generated at 300 will be taken as input by 301 that then tries to generate a complete procedure for it. To do this, it builds out the procedure by asking an LLM to generate an ordered list of tasks that accomplish the objective, and then recursively asks the LLM to generate the set of sub tasks that are needed to accomplish each task. This repeats until it produces a complete procedure.

At 302, detect_issues is a system code/prompt process stored in the database that is a sub process of the auto_populate_database. The process asks the LLM to consider the procedure generated from the execution of generate_process 301 and identify any points where repetition, omission, logical, or factual errors have occurred. To assist identifying these in different domains, a web search component and memory assist may be employed to ensure the LLM has the information needed to detect an error. Each generated procedure is assessed looking for issues to flag, the most frequent of these are then scheduled for a fix.

In certain examples, memory assist here refers to, packing the context portion of the prompts with useful information retrieved from the prompts/responses so far or from some external database—this is the space before the actual prompt that gets submitted. For example, if the system was deployed in an aircraft maintenance facility, it might draw on known procedures and documentation stored in client databases then apply this during the detect_issues stage. In some examples, detect_issues may draw on examples of errors in a relevant domain, or utilize the Query method of the interpreter to retrieve common error(s) s from the database (106).

At 303, a new thread of execution is started for generate_process for each of the identified errors in the generated procedures. Key to the process is that not only that the original procedure is generated but a procedure around each encountered error.

At 304, Before a new code/prompt process can be uploaded to the database it must pass a validation step, e.g., is the output what is expected? Does the sequence complete?

To the extent possible the process is done automatically but some code/prompt processes require some manual validation. As the efficacy of the system overall can be affected by the quality of code/prompt processes in the database, the filtering step can be applied to any new process before the process is persisted in the DB.

In some examples, a system code/prompt processes must generate validation criteria in addition. Again, external knowledge sources and calls to the Query process of the interpreter are employed to pack the pre-prompt context with all relevant knowledge to assist in this task. The Query process may also identify an existing validation process in the database and apply (e.g., as described in FIG. 10).

At 305, In some instances, automatically constructing a validation criterion may not be possible, in these cases the process is flagged and surfaced to a developer/engineer.

At 306, As additional code/prompt processes are added to the database the automatic construction of the original code/prompt processes may be re-attempted, if it is still unsuccessful additional passes through the process may yield success. The process may also be fixed by a developer.

At 307, Once the 'fix' for an encountered error results in a correctly generated code/prompt process that completes validation, the 'fix' can be persisted to the database 106.

At 308, When all issues have been resolved re-generation of the initial procedure can now resume.

At 309, Eventually no errors are detected and the new procedure can now be persisted to the database 106.

The protected interpreter 310 runs on the server and is discussed in more detail elsewhere herein.

The auto_populate_database process 311 wraps all of the functionality described thus far. This file is persisted as a code/prompt system process in the db and contains references to all the specified sub-processes.

Figure 4:
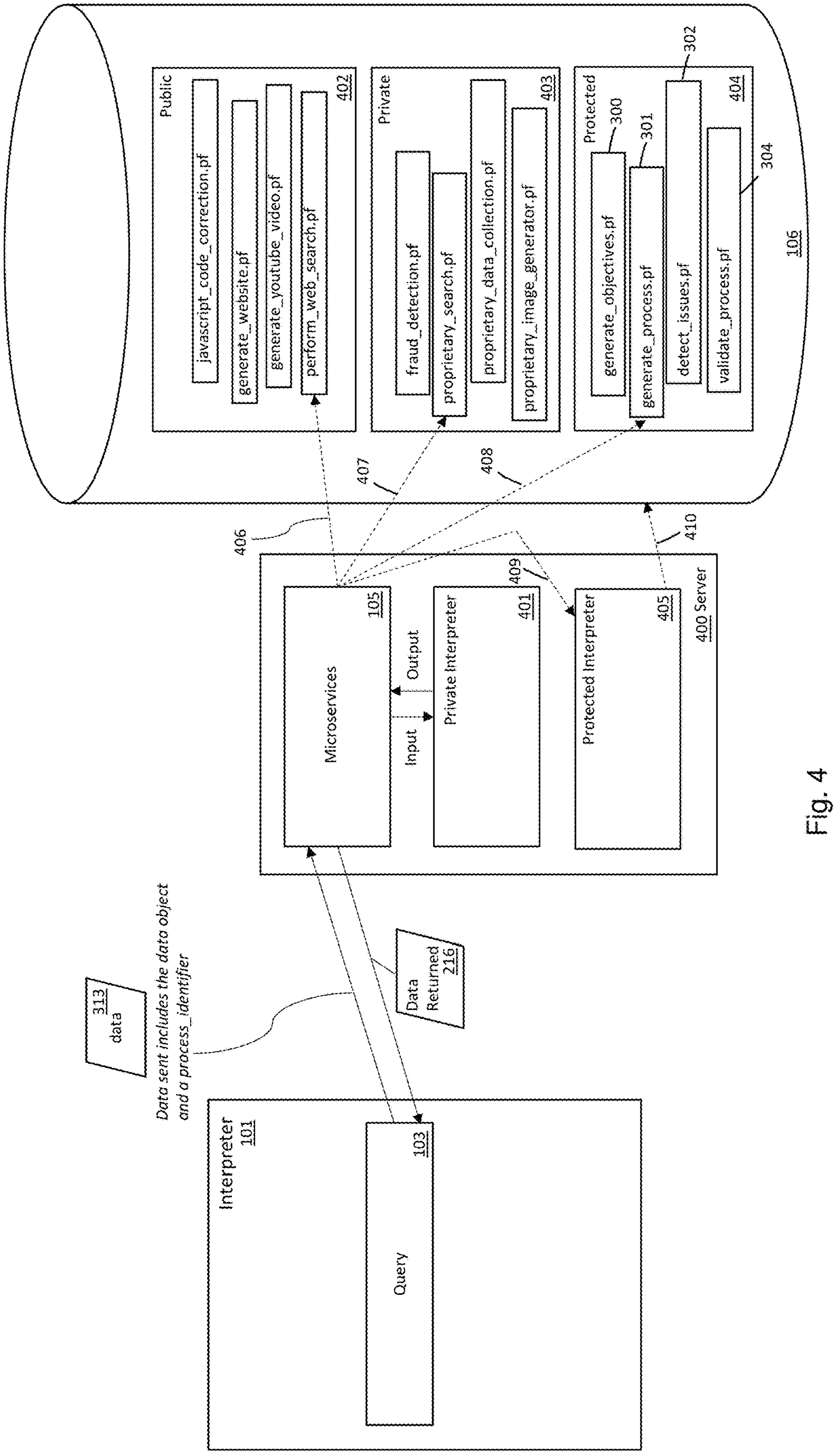
FIG. 4 illustrates communication between the Interpreter's Query process, the microservices, database, as well as a private and protected interpreters according to certain example embodiments.

Description of FIG. 4

FIG. 4 illustrates communication between the Query process 103 of the interpreter 101, the microservices 105, database 106, as well as a private interpreter 401 and a protected interpreter 405. Also shown in FIG. 4 is an example with 3 main types of code/prompt processes that are stored in the database. These are protected code/prompt processes (which may also be referred to as "system" code/prompt processes that are used by the system) that run as background processes on the database to continually improve and generate new code/prompt processes (or sequences of code/prompt processes). Public code/prompt processes which facilitate sharing of knowledge and are useful to developers seeking to debug a process and/or the logic/prompts included in a code/prompt processes. Private code/prompt processes facilitate a method of securely separating the execution of a prompt sequence (e.g., the sequence of code/prompts that may be included in the code/prompt processes). In some examples, private code/prompt processes can be monetized as users can pay for the execution of the process but won't have access to its inner workings (e.g., code/prompt processes as service or the like).

The details of the elements in FIG. 4 are as follows:

- 400 A 'Server' a remote system containing the microservices as well as private and protected interpreter instances, the server of which there could be multiple, communicate with each other, the interpreter used by a client, and the database. An example of server 400 is computing device 1100 of FIG. 11. In some examples server 400 may be provided in the form of a cloud computing environment or the like (e.g., AWS, Azure, etc.).
- 401 Private interpreter, some code/prompt processes may not be able to be exposed to the user. However, it may still be desirable to have these code/prompt processes be used. Accordingly, when private code/prompt processes are used they are executed within the data boundary of the server and the code/prompt processes is not returned to the user/requestor. Rather the results of execution of a given private code/prompt processes may be returned.
- 402 Public, this region denotes that there are certain code/prompt processes in the database which do not need to be externally run and can be returned to a client who requests them, several examples are included in this section.
- 403 Private, this region denotes that there are certain code/prompt processes in the database which must be externally run and are not to be returned to a client who requests them, however the input and output from these code/prompt processes is permitted.
- 404 Protected, some code/prompt processes form core processes and may exist in perpetuity on the server 400, these processes may perform useful functions and may be setup to only ever be executed by the server and not invoked by the user/client.
- 405 Protected Interpreter is an interpreter where all the protected code/prompt processes are run, managed by the microservices and server configuration. It will be appreciated that in some examples each of interpreter 101, private interpreter 401, and protected interpreter 405 may share the same or similar code bases for executing the logic of the respective interpreter. Accordingly, each version of the interpreter may be viewed as another instance of an interpreter process that is configured according to the functionality/requirements of that specific instance (e.g., per 101, 401, or 405).
- 406/407/408 The microservices manage communication with all 3 of the different types of code/prompt processes on the database. Data flow line 406 shown in FIG. 4 indicates the interaction with the public code/prompt processes (data flows both ways on these lines). Data flow line 407 indicates the interaction with the private code/prompt processes (data flows both ways on these lines). Data flow line 408 indicates the interaction with the protected code/prompt processes (data flows both ways on these lines)
- 409 Denotes the communication between the protected interpreter and the microservices (data flows both ways on these lines). For example, microservices 105 calls protected interpreter 405 and passes data to the same.
- 410 Denotes the outcomes of the protected interpreter make updates to the database. Specifically, the outcome/results of execution of the protected interpreter are not returned to a client (e.g., because the protected interpreter is an internally executing interpreter), rather the results are stored back to database for future use.

Protected interpreters include interpreters running system processes (e.g., those that may be critical/important to overall system operation) that modify the process database via a defined set of pipelines which are included with the system 50. These pipelines include migration of existing code/prompt processes across model updates, Validation and verification of existing code/prompt processes, Novel code/process generation, additional process abstraction, data mining of connected resources, and others. Depending on configuration, protected interpreters may run any of these processes in a conditional way (e.g., being triggered based on processing of an event or the like) or based on some periodic interval. The server may also be configured to perform these processes in an adhoc manner, e.g., executing only when receiving administrative commands from authorized users.

Some processes may be protected but also run on the private interpreter, these can be invoked via a client calling the microservices or via their client interpreter, some protected processes they may invoke include 'Automatic Prompt Tweaking/Improvement', 'code generation pipelines for model error correction'. For example, a regex may be applied to fix issues in the model output if it occurs. This list of pipelined processes is expected to grow as users add to the database, new code/prompt processes can be added as desired.

Figure 5:
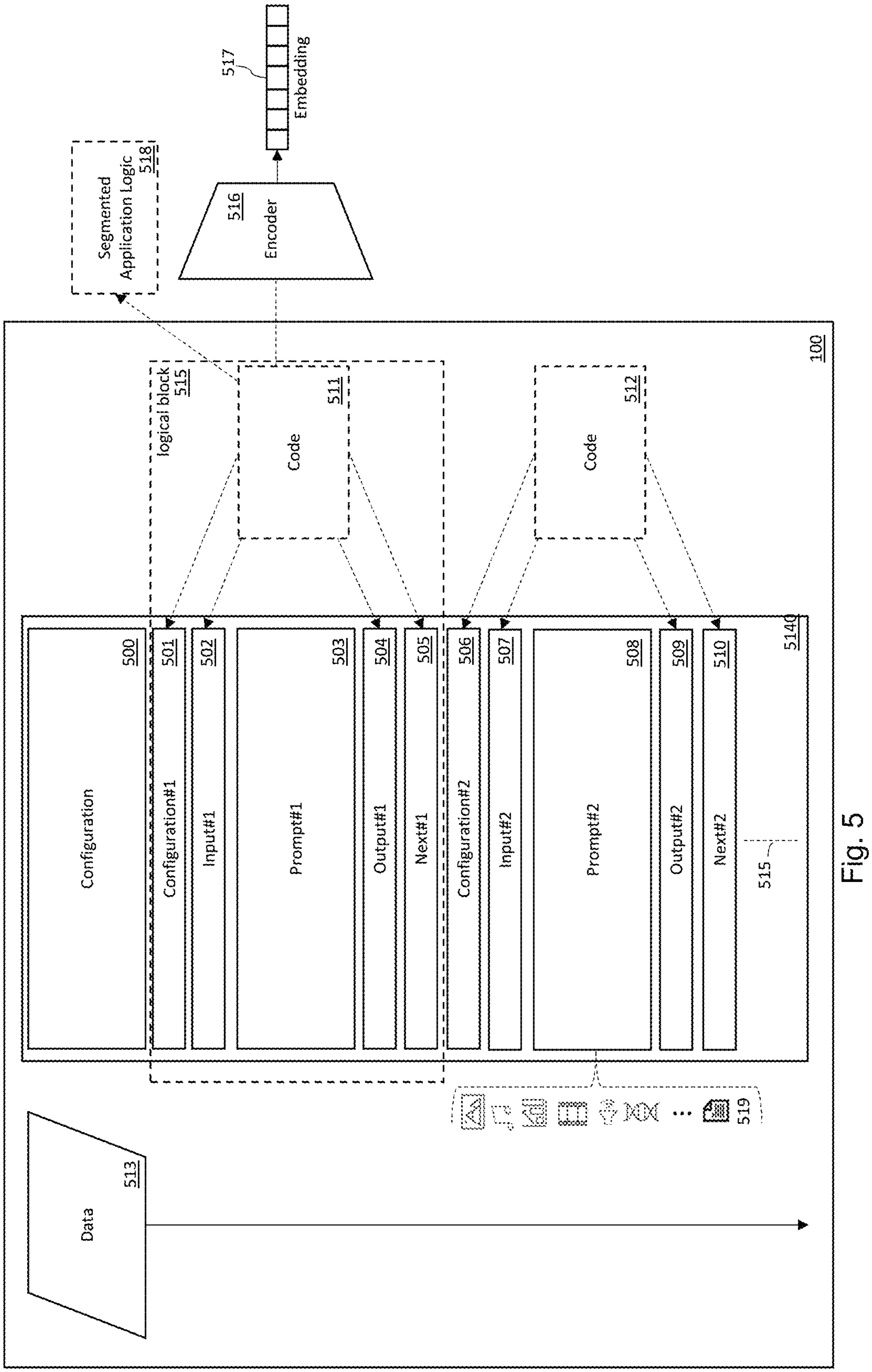
FIG. 5 illustrates a format of a code/prompt processes data object according to certain example embodiments.

Description of FIG. 5

FIG. 5 illustrates an example of the file format or data model for a 'code/prompt process' data object that can be used by the system. Code/prompt processes include two components: 1) a prompt/configuration component (this houses the prompts and configuration information) and; 2) a logical component or 'code' component (this houses traditional programming language logic). As shown in FIG. 5 a data object may be used in connection with the example embodiments described herein and may be carried throughout the execution of an illustrative code/prompt process and/or populated at each step by the interpreter 101.

Use of a code/prompt processes data object in connection with the example embodiment shown in FIG. 4 may result in one or more advantages being realized over other sequence prompt configurations.

More specifically, the logic sections can be fully segmented from the prompt sequences. This makes it easier to compartmentalize different types of instruction. In connection with certain example embodiments, it may be easier to understand and easier to update using the data object of FIG. 5 as the amount of code knowledge may be needed to construct a functional pipeline may be relatively decreased.

The logic sections may also be segmented sections that modify either the input and output separately or it may reference a function that modifies both. In FIG. 5 logic sections are denoted as a singular block labelled 'code' in the diagram, however the data boundary may be drawn to segment the code which modifies the input and output separately as well. In any case, the deterministic logic that is encapsulated in these regions is intended to be any code that is immediately relevant to the step, e.g., logic that defines how the model input/prompt is modified before it is sent to the neural network and how the output is handled after. This forces a design pattern that lends itself well to facilitating many other benefits of the system (e.g., finding similar steps in the database, re-using existing sequences, providing for easily maintainable code/prompt processes, etc.). Code in these segments may also call external libraries and these calls may only be referenced in the code segment not fully included. In these cases, a descriptive comment is typically sufficient for relaying the functionality but not all application code needs to be included in these code segments, only what is relevant to the step.

Complexity may also be decreased (e.g., significantly) as unlike, for example, a singular python script which might combine the code, prompts, and execution logic into a single file. According to the techniques described herein, because the logical component is handled by an interpreter, the code/prompt processes can be much more compact. Advantageously, the compactness of the code/prompt process structure described herein allows each logical block (e.g., 515) of a code/prompt processes (and in some cases entire code/prompt processes) to fit within the context window of certain example LLMs. This allows the target LLM to manipulate/generate the code/prompt processes in its entirety.

In certain example embodiments, each combination of code and prompt comprise a specific 'logical block' of a code/prompt process can be segmented into an extensible component. This advantageously makes re-use easier than other example techniques.

As shown in FIG. 5, logical blocks (e.g., 515) of a code/prompt processes may be encoded or otherwise transformed into embeddings. This aspect can enable a variety of other operations to be performed on the logical blocks-including a fast and effective search).

Configuration 500 includes instructions for the interpreter on how to execute the prompts, code, and configurations. This can include, for example, a maximum allotted prompts which the user will allow before termination. Configuration 500 may also include information specifying the mode the interpreter should operate in (e.g., automatic, manual, hybrid, etc.)

Configuration 501 of the first logical block 515 may include the target model and any configuration information needed to run the model (e.g., an API key, etc.), additional behaviors like what types of memory to use (e.g., whether a message history should be used or not, whether pre-prompt information should be added prior to the query, or whether a function (e.g., a python function) should be invoked prior to execution) may also be included as part of this aspect of the object.

Input 502 of the first logical block 515 may include a reference to a variable in the data object or may include a functional reference in the code. If specialized modification of the prompt is needed before prompting, then this field might appear as a functional signature (e.g., execute_code_block (data)). In such cases, the function may update the data object based on the code and/or may augment the prompt prior to running.

Prompt 503 of the first logical block 515 is the prompt that will get sent to the configured model. It may contain parameter names that are modified by the data object prior to execution. For example, a prompt could be something like 'Generate a ordered procedure for accomplishing the task' {task_name}'" where the data object modifies the prompt each time it is run by the value assigned to task_name. Continuing the example this may be something like "generate a website".

Output 504 of the first logical block 515 is the output from the model, as with input it may contain a reference to function in the code where the output can be properly processed, potentially updating the data object.

'Next' 505 is a section of the first logical block 515 that is used to store data that tells the interpreter which logical block to switch to next, as with input and output this may also contain a reference to a function in the code where additional logic influences this decision. In some examples, re-ask logic may be inserted into this section—e.g., if the model did not produce the correct output, then a reference to a function that examined the output may modify the prompt and re-ask it. Alternatively, an entirely different logical block may be jumped to based on a determination that a model did not return the correct output. If no 'Next' information is provided, then sequencing information is assumed by the natural ordering of each logical block in the prompt/configuration file.

Block 506 may be the same or similar to 501, except this 'configuration' block refers to the next logical block in the file. There may be any number of such logical blocks and all will have these components. (Note: not all steps may be fully described, some logical blocks may simply contain a reference to other code/prompt processes in the database).

Block 507 may be the same or similar as 502, except this 'input' refers to the next logical block in the file. There may be any number of logical blocks and all may have these basic components—e.g., input functions, output functions, prompt, configuration, next, etc.

Block 508 is the same or similar to 503 with the exception that this 'prompt' refers to the next logical block in the file, there may be any number of logical blocks, all will have these basic components.

Block 509 is the same or similar to 504 with the exception that this 'output' refers to the next logical block in the file, there may be any number of logical blocks, all will have these basic components.

Block 510 is the same or similar to 505 with the exception that this 'next' refers to the next logical block in the file, there may be any number of logical blocks, all will have these basic components.

Code 511 is the code segment of the first logical block, not all logical blocks may reference code, but most will, the code section of the code/prompt processes contains all the logic, functions etc. that manipulate the input, output, execution flow and data object. Code may call functions externally or manipulate resources in a data folder or create/modify/delete files on a system, it depends heavily on the logical blocks configuration (e.g., what is the code permitted to do). The section is highly variable as it enables custom control of the prompt sequence.

Code 512 is the same or similar as 511 with the exception that this code effects the second logical block, both code blocks reference a singular 'code' section of the data object, but are noted in different shapes as different functions in that code section would likely govern the logic in each respective logical block.

In some examples, 511 and 512 may also interact with additional application code 518 which is segmented from the logical block. More specifically, additional application code 518 denotes that some logic (e.g., external logic) can be is used in connection with processing of a code/prompt processes. The additional application code 518 may be omitted from the logical block (and the corresponding embedding). Additional application code 518 can include calls to external libraries, logic that initializes database connections, and other code that may be used by the code/prompt processes, but may be segmented from the task. This logic may be called via functions/interfaces/etc. in the code block where the input and output of these functions is understood but complete implementations are not envisioned in all circumstances. In some examples, code 511 and 512 can represent task related logic (e.g., logic that modifies the input/output of the step within the code/prompt processes, effects sequence flow, and/or updates the data object).

Data 513 (also 313 in FIG. 4) is used to represent that the data object is updated over the course of a code/prompt processes' execution. This may act as a storage, caching the input and output of each logical block as well as containing the initial input submitted to the code/prompt processes. It is typically returned when execution of the code/prompt process completes. (Note: the data object can contain parameters for prompts that influence the output of the target neural network)

514 is the code/prompt process that includes the collection of all logical blocks 515 (e.g., one or more) and other data. Code/prompt processes 514 may be stored as a configurable file that holds sequential prompts, configuration information and code in a compact format. (Note: logical blocks may also contain pseudo instruction, when processed by the interpreter these will get populated by relevant information from the database.)

In some example embodiments, each logical block 515 can be independently processed by the interpreter to generate a descriptive embedding via an encoding process of an encoder 516 that produces an informative embedding which can facilitate a search of the database. This process is automatic and occurs whenever the user engages the query process of the model or executes in automatic mode. An advantage to the structure of the code/prompt processes is that it easily encapsulates the logic of each step in the prompt sequence and can create a descriptive embedding that makes database searching efficient.

The embeddings 517 of each logical block can be stored to a database or other storage, combined, and/or used to identify applicable or similar code/prompt processes in the database(s). This process is automatic as well. 517, 516 facilitate a recommendation function involving the query sub process. Effectively these operations make it possible to author code/prompt processes with minimal input and natural language, the microservices can then search for similar concepts in the database. If the retrieved code/prompt process(es) needs to be adapted by the microservices in order to work with the user's data object a system code/prompt process will be executed that performs the adaptation. This is similarly effective for code segments, individual prompts and relevant data. (e.g., adapt_process.pf will be retrieved from the database and run on the client's interpreter if public, if private adaptation is run on the remote interpreter).

In some examples, the embeddings generated in connection with each logical block may be based on every component thereof (e.g., configuration 1 501, input 502, prompt 503, etc.) In other examples, select aspects may be used for a given embedded. In certain examples, two or more embeddings may be generated. For example, an embedding of configuration 501, input 502, and prompt 503 may be generated. Also, an embedding of prompt 503 and output 504 may be generated.

Figure 11:
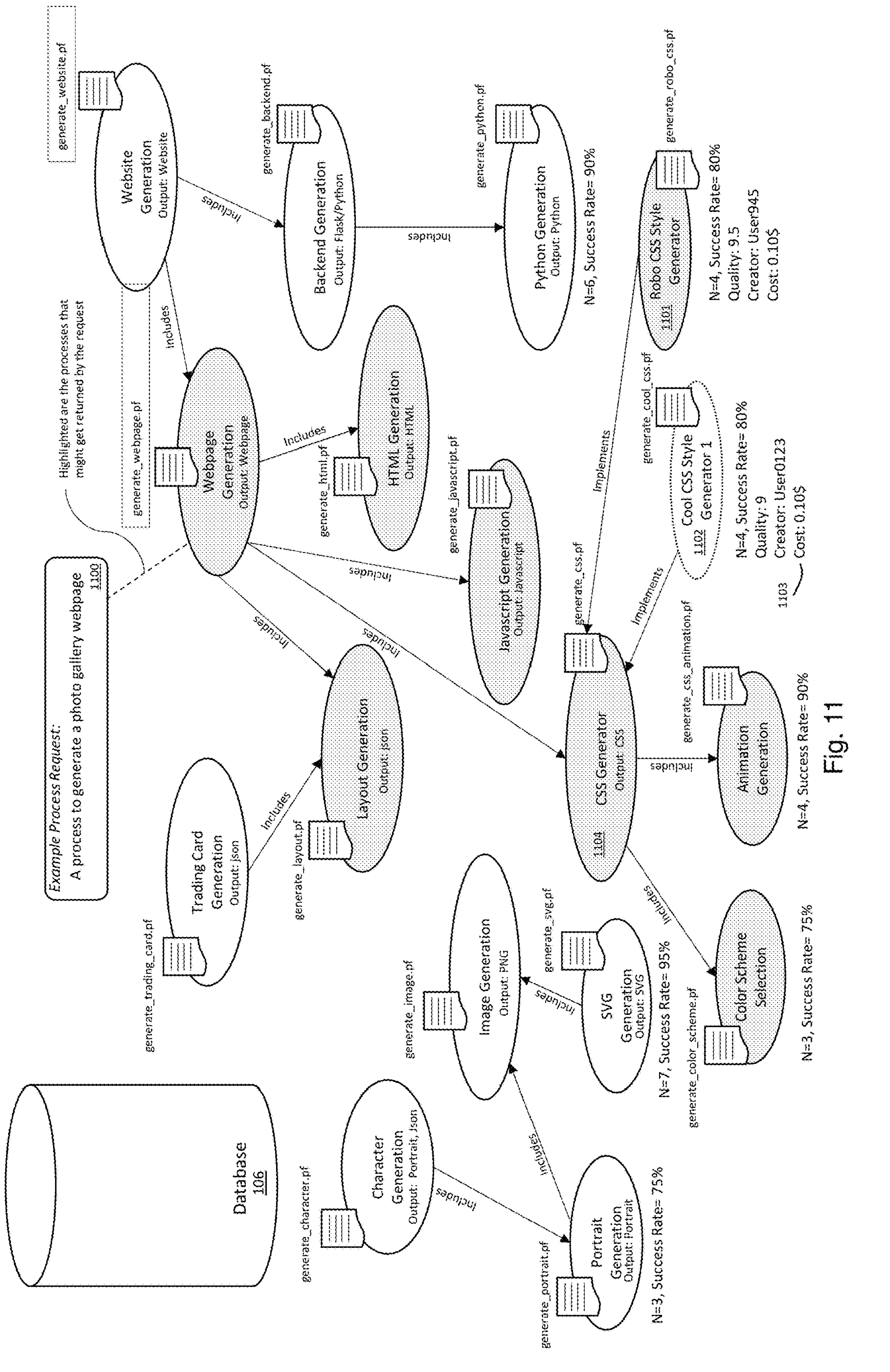
FIG. 11 illustrates how code/prompt processes in the database are stored as a connected knowledge graph.

Described in greater detail in FIG. 11, Code/Prompt sequences can be stored in a connected knowledge graph (e.g., a type of data structure). The connected knowledge graph may function as a process database or a database of Code/Prompt sequences. In some examples, each process can be represented by a node within the knowledge graph and each sub process or 'step' can be as a represented node. The nodes within the graph are then connected via directed relationships. With such a data structure, a graph query can be used to retrieve, for example, steps that are shared between processes. As discussed in herein, use of a knowledge graph also permits prioritized updating when new models are introduced (e.g., a new version of an LLM or an entirely new LLM).

In some examples, there may be more nodes than just process nodes stored in the graph. Additional node types can include nodes for 'process outlines' pseudo code of a processes algorithm, metadata including runtime statistics, data nodes (e.g., data that is required by the process), validation data/information on expected input and output of the process and/or step, process implementation nodes (e.g., which may be instances of the same process that may be preferable in some circumstances, such as if a developer prefers to use a certain model).

Protected processes are included in the system and can be used for automatically upgrading persisted Code/Prompt processes (e.g., that are part of 109). For example, when a new model or an update to a model (e.g., 107) is released. When desired the protected interpreter invokes a process upgrade pipeline that migrates existing sequences using the data model and graph structure. The features of the process upgrade pipeline may include the following:

A process is identified in a knowledge graph. Such identification may be explicit or may be determined by finding the most connected processes in the graph.

Inputs and outputs from previous process runs that are cached in the graph are retrieved. In certain examples, such data is found via validation nodes connect to one or more process nodes of the knowledge graph.

When a new model is swapped out for a current model (e.g., GPT-4 is changed to GPT-5) and the identified process is run. If the new process matches the old process, the update continues. If not, the update is stopped and no new node is added to the graph as the new model is unable to perform at the same level as the prior model. In some examples, this is noted in a metadata node attached to the process when this happens.

If swapping the models did not harm performance, then the update process proceeds. Next, the steps in between the first and last logical block are iteratively consolidated and tested via an adaptation process where the LLM is given the instructions (e.g., code & prompts) for 2 steps and asked to produce a single step that performs both instructions. If the new instruction produces equivalent output as the prior steps, then those steps are removed from the new model's process. Equivalence in outputs may be determined via semantic similarity—e.g., embeddings/cosine similarity, or directly via model output (e.g., by sending the outputs to an LLM and ask the LLM if they are the same). In some examples the equivalence may be based on the type of model and/or process. Information on which equivalence technique/algorithm to use during an update can be stored on the metadata node connected to the process.

Once the minimum number of instructions has been determined—e.g., the point at which any further consolidation fails to create a combined instruction that can generate the same output as the prior sequence's steps—the completed sequence is stored in the database. The new process can be represented by a node in the database which shares the connections of the existing process node for the same task.

At this point the new process may be invoked by a client interpreter. As the runtime statistics increase, and successful utilizations increase, this gradually replaces the default process selected for the particular task.

In some examples, both processes remain in the graph. In some examples, additional system rules may deprecate and eventually delete older processes. This may be controlled by a dedicated code/prompt sequence and/or be configured in a server configuration.

It should be noted that this is just one implementation of the update process, and that the logic used for the update pipeline may change over time.

Returning to FIG. 5, 519 is identifies that while a 'prompt' in this context can mostly mean parameterized text that is augmented by the data object, other mediums may be equally useful for providing instruction in the future-especially with the advent of multi-modal models. In this context, prompting may grow to mean providing instruction in a non-textual format (or mixed medium) and it may be more efficient to convey instruction in this way. For the developer this will likely mean conveying the code/prompt sequences through a custom visualizer/user interface, but as the models themselves become more adept at developing their own code/prompt processes it may be that instruction conveyed in these alternative formats results in more capable solutions. Even in this context it is envisioned that there will continue to be a need for deterministic logic that modifies these prompts both before they are sent to the model and after they are produced. The data model presented encompasses these other formats in a similar fashion, as long as the interpreter can support them—e.g., as long as the model used in their execution understands this type of input. It should be understood that 'prompt' in this data model represents whatever instructional input shall be sent to the model. Accordingly, a prompt can vary from, for example, an image in one case, text in another, and sound/audio in another case.

Description of FIGS. 6-10: Examples

Figure 6:
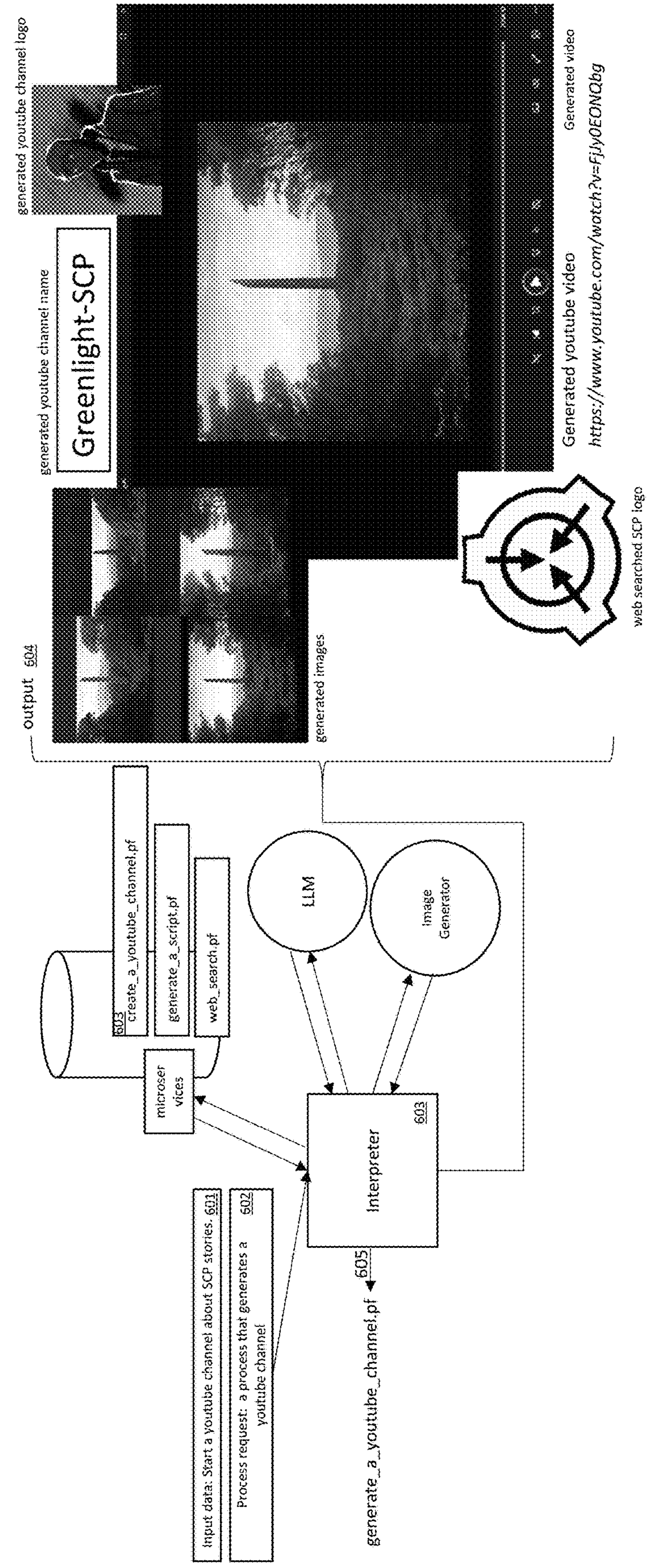
FIGS. 6-10 each illustrate a different example using the system shown in FIG. 1 according to certain example embodiments.

FIG. 6 shows an example of the system generating a youtube channel, greenlight-scp. The process generates a story inspired by content on the web, creates a script, generates a narration track, generates the images for each scene, creates transitions between scenes, adds a music track, creates a channel on youtube, generates a background for the channel, image generates a logo for the channel, uploads a video to the channel.

Figure 7:
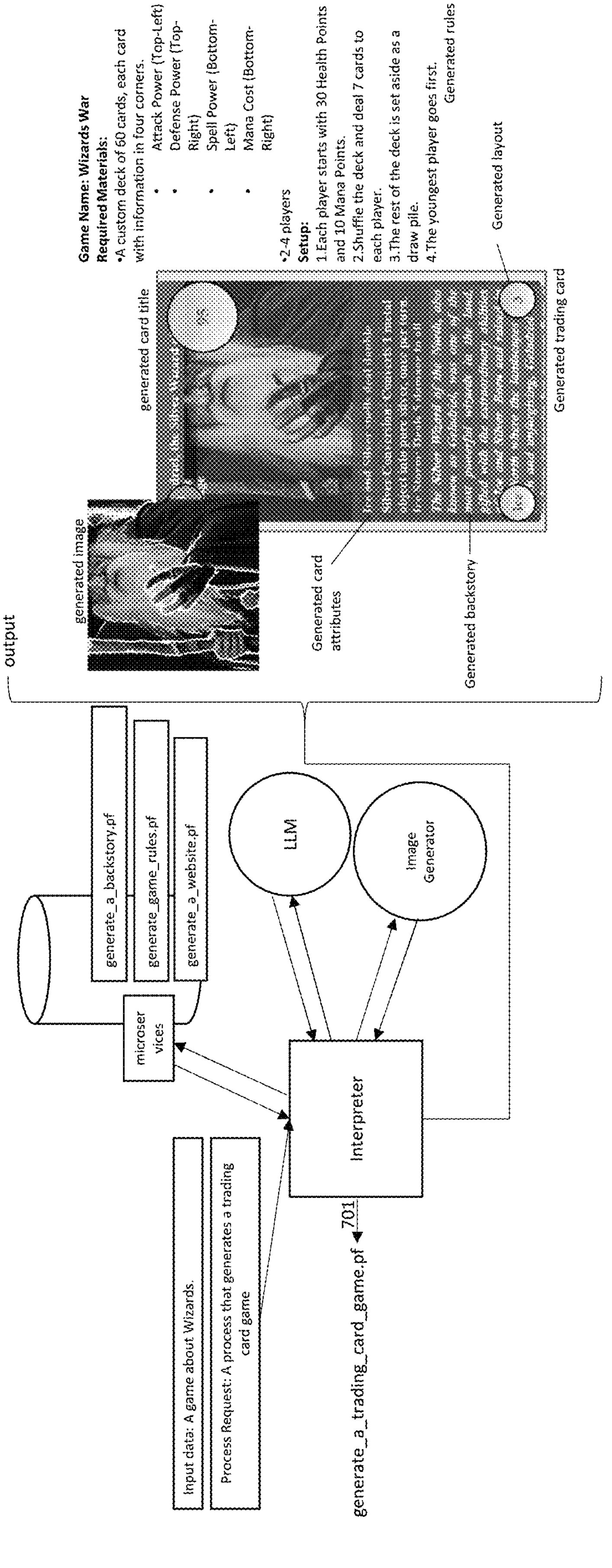

FIG. 7 shows an example of the code/prompt processes system generating a trading card game about wizards. The system generates the rules for the game, the layout of the trading card, the images on the trading card, the abilities of the card, name of the card, backstory for the card. The card layout is generated by the generate_a_website code/prompt processes, this produces an html file that acts as a template, the cards and rulebook can then be printed out.

Figure 8:
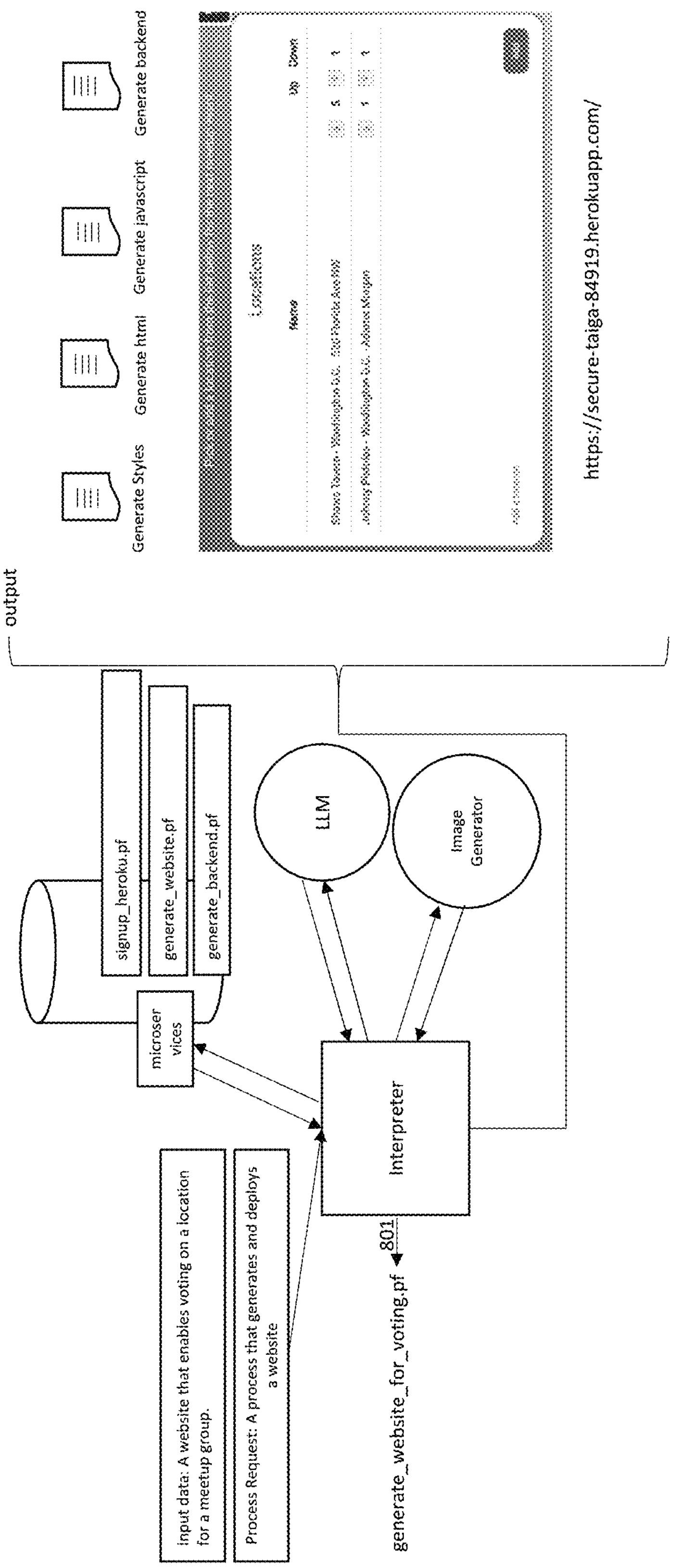

FIG. 8 shows an example of the code/prompt processes system generating a website for voting on a meetup location. The system generates the css, html, javascript, programs a backend and uploads the website to Heroku, link is now publicly available. The figure also illustrates how existing code/prompt processes in the database get applied to the process.

FIG. 9 shows an example of the code/prompt processes system generating a book, sub processes are produced for each step, generate a book cover, generated a table of contents, generate a chapter. The result is stitched together into a word document.

Figure 10:
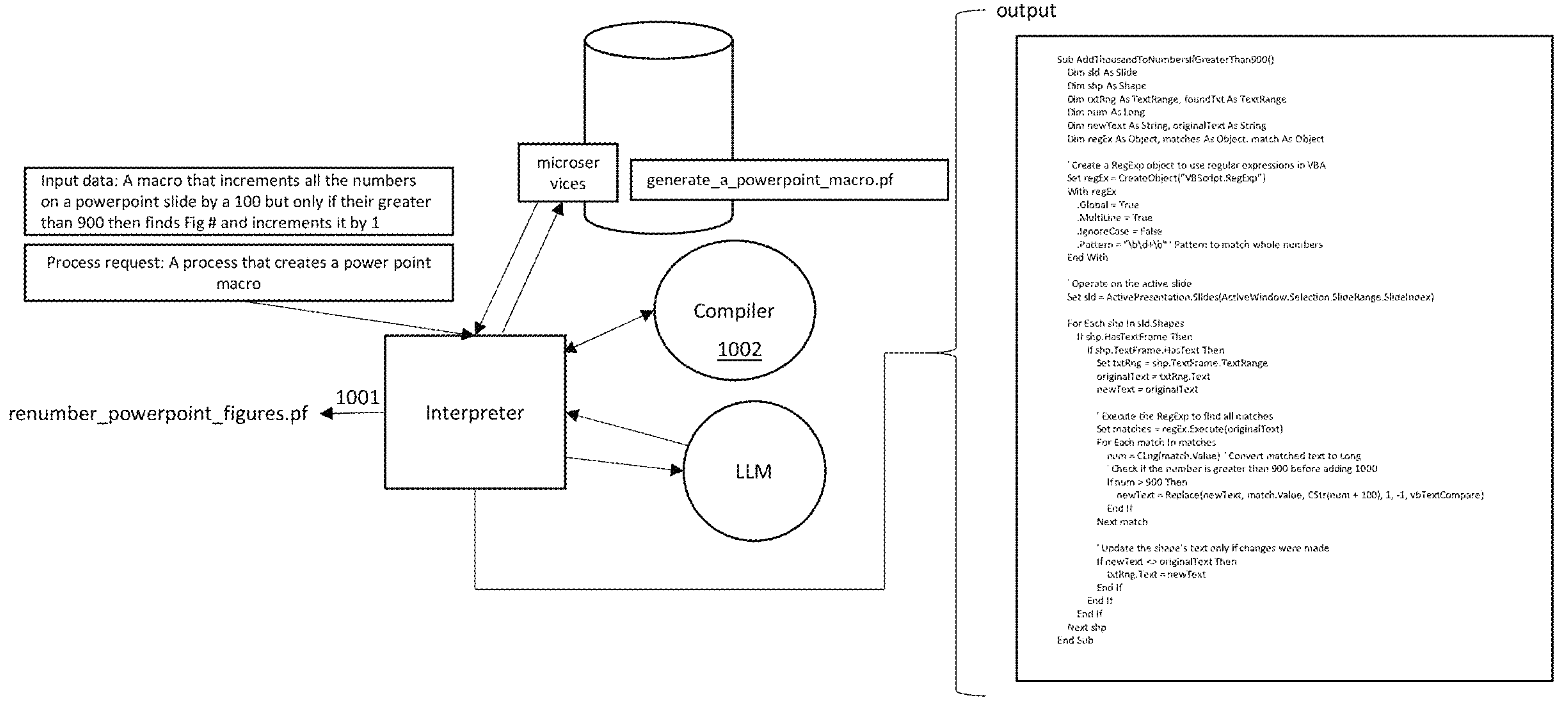

FIG. 10 demonstrates how the system may produce useful processes that output code. In the example, the system produces the code for a powerpoint macro that may be particularly useful on patent applications when an author wants to change the ordering of the figures but doesn't want to update all the individual numbers in the slide.

As shown in FIG. 10, an additional resource that the interpreter may interact with in connection with execution of a code/prompt processes may be a compiler, assembler, or other process that deterministically transforms an input into an output (e.g., an executable or other output). Such other processes may be deterministic process or system that provide feedback given an input (e.g., data, such as source code or the like) and provides a responsive or transformed output. In other words, compiler and other types of processes that are different from a model (e.g. an LLM) may be used by the interpreter in connection with executing code/prompt processes.

FIG. 6-10 demonstrate a variety of example outputs that the system is capable of. The interactions that occur to facilitate this may be understood as follows:

User submits a request to build a process (process request) along with any other relevant data they may have. This may be input data, such as input data the user wants to send to the created process. Data that is submitted may also be more structured. For example, it may be a process outline, references to existing code/prompt sequences, a completed code/prompt process, and others.

The client interpreter analyzes this input and engages the query module which sends the request to the remote server (microservices) which executes find/adapt applicable sequences on the private interpreter.

Using the remote private/interpreter, A Find applicable sequences processes is engaged and executed, the process information is turned into an embedding which is used to search for the exact sequence.

If the process fails to find an exact match for that sequence (e.g., based on a semantic similarity threshold, then the private interpreter generates processes that may be included in this process. These may be sub-processes. These "sub-processes" are then used to similarly search the database for relevant processes.

The results from the further searching with the sub-processes are then returned, and the interpreter selects the results that have some utility to the user's process request. In some examples, the selection may be performed via messages that are sent to an underlying model which is configured in the find processes code/prompt process. Additional details on this process is provided in FIGS. 12 and 15.

It will be appreciated that in connection with certain example embodiments that using both search and the model in this manner can be a compromise between fidelity and performance. The model provides a means to provide higher quality output albeit more costly, while search provides a means to provide cheaper output albeit lower quality. In some instances, (e.g., where models may operate with an increased context field and/or a cheaper token price), it may be more beneficial to utilize the model solely for the search task. However, in certain examples, embedding search and model inference can be combined to find relevant processes.

In any event, supposing the model identifies existing processes that can be included to meet the user's process request, the model proceeds with adapting the retrieved processes. For the adaption, the private interpreter executes the adapt sequences code/prompt process using the retrieved processes as input.

Adapt process assembles the retrieved processes into a new sequence and identifies any steps that are missing from the sequence. missing steps are found in the adapt process, it then attempts to create these missing steps.

Once this is completed the final process is assembled and returned to the Query process in the client's interpreter.

From the query process, the interpreter may return this to the user, for example, if in a development/manual mode the sequence may be returned and not executed (e.g., this aspect is indicated in the diagrams via 605, 701, 801, 901 and 1001). If, however, the interpreter is configured for an automatic mode it may also execute the new process.

In the case of the interpreter being configured for automatic mode, the newly constructed sequence is now sent to the execute portion of the interpreter where it is broken into steps/logical blocks.

Each logical block is composed of traditional logic/code, executed at both the input and output of the block (e.g., before the prompt is sent to the model and after). This code then updates the parameters in a data object and this data object is used to modify the prompt which is sent to the model or the output which is returned to the user or carried to the next step.

The interpreter iterates through each logical block, following the natural ordering of the sequence or utilizing any configured variations of the execution path as indicated in the 'next' portion of the logical block.

Note that, some blocks may be run in parallel if configured, this may be done via the developer or via the adapt process. A visual means of conveying the execution path in the code/prompt process is envisioned to be supplied alongside a code view of the process via a UI that facilitates easier development.

When all blocks are executed, the final output is packaged and returned to the user in the means they've configured. This may mean files being constructed, it may also mean interactions or instructional commands are given to the client's computer that automates some behavior (e.g., mouse movement, providing input to an application, playing a sound, etc.)

It will be appreciated that additional functionalities may be provided by the system. Indeed, the intent of the system is to provide a rapid means of providing novel capability that exceeds the performance of the underlying base model. The system functions, at least in part, by utilizing pipelined sequences which control the application of cached logic and this enables new model capability to be added to an underlying model without the need for additional training and without the need for explicit instruction. As described in these examples, the system enables light instruction (process requests/process outlines) to quickly produce new code/prompt sequences.

Over time as base models increase in sophistication their capability to perform the operations described in the system is expected to greatly expand. With the framework described in place the necessary pipelines will exist to rapidly identify and fill in new gaps in model capability. What emerges from this then may form a kind of 'innate memory' for new AI systems, a database of historical procedures carried out by the prior generations of models. Hardwired processes that enable behaviors in the same way animal's brains know certain behaviors at birth. As it is far easier to construct code/prompt processes than it is to train new capability, it is likely that this process layer of procedures will be responsible for the majority of AI capabilities.

The described system provides a comprehensive framework facilitated by a small (er) number of established system pipelines, the data model, and the interpreter to quickly enable models to expand in capability many times faster than they could if they were dependent on only training.

Description of FIG. 11

FIG. 11 illustrates how code/prompt processes in the database are stored as a connected knowledge graph. In the graph each node represents a different code/prompt processes with pipelined logic to accomplish the indicated task. Metadata and statistical information regarding each process runtime is also shown, this data assists various microservices and gets surfaced (e.g., displayed or otherwise made available) to developers. Organizing the code/prompt processes into a graph assists in applying efficient search algorithms and facilitating additional microservices that can optimize the processes over time. Also shown is how different tasks may contain overlapping components. Different node types and relationships exist in the graph, and these can be leveraged to assist functionality across the system.

(1100) Depicts a process request and how the connected process graph may be engaged by it, responding with the existing processes. The hypothetical output of the process request and the existing input from the client is used to query the graph for relevant processes (more detail in FIG. 10). This finds the root node of the related process and walks the graph to capture all sub processes.

1101 and 1102 depict user processes that have been uploaded to the database which are in competition to be the default CSS Generator implementation. In this scenario the process that gets returned is decided by the metrics and settings the user has configured.

1103 Depicts the metrics used to determine which process is the most appropriate to return to the user, notice that a cost is indicated with both processes. Owners of code/prompt processes in the system may extract a fee in some cases when a process they own is invoked. This is meant to incentivize participation in the system.

1104 denotes the root process for css generation, there may be different css generators in the graph, however a root process will always contain the most basic implementation of the fundamental process. If the user had specified to avoid code/prompt processes with a fee associated, the root process would have been returned.

Figure 12:
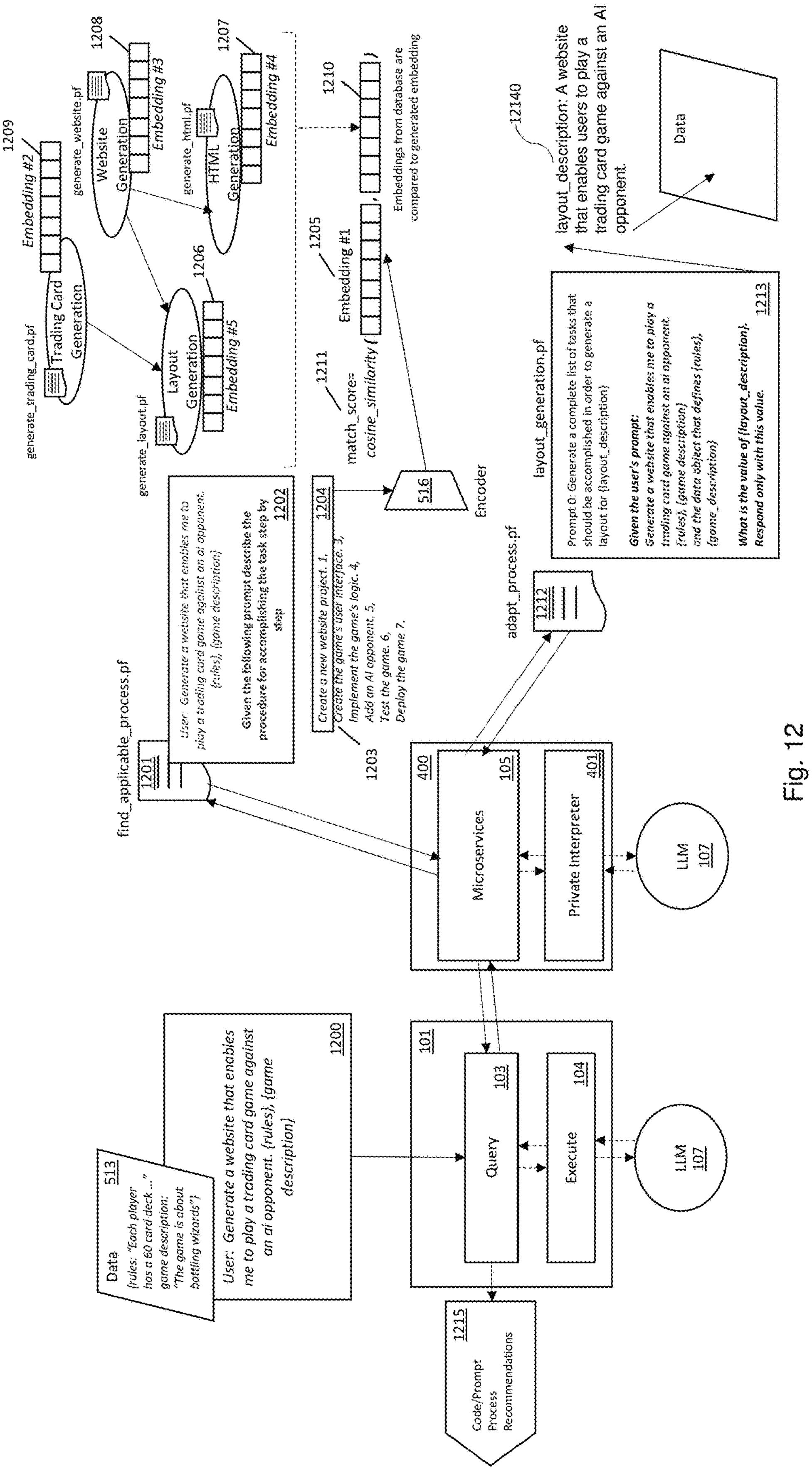
FIG. 12 illustrates the automatic matching functionality in the system shown in FIG. 1.

Description of FIG. 12

FIG. 12 illustrates the automatic matching functionality in the system, the process facilitates rapid development of code/prompt processes by quickly adapting code/prompt processes from the database and enables an automatic mode where code/prompt processes from the database are dynamically applied. In the recommendation workflow, users submit their prompt/pseudo instruction along with their data (513) to the query process of the interpreter (1200). This prompt and data are then sent to the microservices which retrieve a system code/prompt processes via find_applicable_process (1201). This code/prompt processes may then be executed by the private interpreter. System code/prompt processes are a type of code/prompt processes that is run internally and may not be directly accessible to third parties. They can be, for example, pre-installed and be part of the database. Examples include generate_objectives.code/prompt processes and generate_procedure.code/prompt processes.

The find_applicable_code/prompt processes.code/prompt processes is used to first transform the users prompt into a more meaningful query, second to filter the LLM responses and ensure they are properly formatted, thirdly to create a meaningful embedding that can be compared against embeddings in the database, and finally to return the recommendations to the query process of the client's interpreter (1201).

To appropriately transform the users query into a more meaningful query (e.g., a query that is consistent with how data is stored in the database) find_applicable_code/prompt processes.code/prompt processes appends the users prompts with questions that guide the LLM into generating a procedure that might accomplish the user's intent in their prompt. This produces aan output (1203) that more closely conforms to the generated code/prompt processes which are stored in the database and enables an effective semantic search to be conducted.

Each step in the newly generated step-by-step procedure (1204) can now be encoded into an embedding and this embedding can be compared to the existing embeddings in the database (1206, 1207, 1208, 1209). As noted elsewhere herein, these stored embeddings are produced from the generate_objectives.code/prompt processes and generate_procedures.code/prompt processes being executed on the protected interpreter. Such embeddings may also be created when a new code/prompt processes is uploaded to the database after undergoing the validation and verification step. In some examples, (e.g., when enough code/prompt processes exist in the database) a custom encoder can be used to perform the encoding operation. This would be done by finely tuning a model with code/prompt processes in the database and may lead to a more accurate embedding. In other examples, an externally sourced encoder is used (e.g., 3rd party API, openai's embedding solution). The encoder and the encoding process are used to generate a meaningful embedding that enables a quick means of traversing the database and finding relevant information.

1210 illustrates how the embeddings from the database would be compared against the embedding of the user's prompt. Embeddings can be operated on by mathematical operators. As in certain examples, cosine_similarity is used (1211) to establish a match_score. This would then be used to sort the returned list of relevant code/prompt processes by similarity. It will be appreciated that embeddings represent a point on a multidimensional plane that constitutes the model's 'concept' of a given input. 2 points on this plane enable a distance calculation to be performed, along with normalization this produces a rough score for semantic similarity between 0 and 1. The score is representative of how 'similar' 2 inputs/concepts are). In some examples, using open ai's embedding solution, the first step of the procedure generated by the user's prompt 'Create a new website project. 1,' would match the "generate_a_website.code/prompt processes" with a score 0.85, significantly higher than the other code/prompt processes in the database and above a pre-defined 'no match' threshold—e.g., 0.8 or the like.

Once the applicable code/prompt processes have been identified they are sorted according to the generated step-by-step procedure and returned to the microservice along with their confidence scores. At this stage the microservices trigger an adaptation process adapt_code/prompt processes.code/prompt processes (1212), which may be another system code/prompt processes. This is the final step prior to the recommendations being returned to the client, at this stage the applicable code/prompt processes are assembled into the sequence suggested by find_applicable_code/prompt processes.code/prompt processes, modification of relevant logical blocks and the users data object is performed then the entire code/prompt processes is assembled and returned along with any modifications to the user's data object that are needed.

This described process makes it possible to fully construct a new/novel code/prompt processes from the existing code/prompt processes in the database—e.g., with minimal input.

As seen in the figure in 1213, adaptation/novel code/prompt processes construction is accomplished by using the LLM in connection with the retrieved code/prompt processes(s) and reframing the existing prompts and code into the context of the user/client provided prompt and data object. For example, and as shown in FIG. 12, the version of layout_generation.code/prompt processes that is retrieved from the database (1213) has a mismatch with the user's data object and expects a value for {layout_description}. For the assembled code/prompt processes to function a meaningful value must be added to the user's data object and this is accomplished by submitting the information the client/user provided along with the prompts in adapt_code/prompt processes.code/prompt processes to an LLM which generates the required value at 1214. In other words, the layout description variable that is required by the retrieved existing code/prompt processes is generated by using the user submitted data to the LLM to determine what the value for {layout_description} should be.

Seen below is the result of applying adapt_code/prompt processes.code/prompt processes to generate_layout.code/prompt processes:

The prompt below is the first prompt in generate_layout.code/prompt process.

Prompt 0: Generate a complete list of tasks that should be accomplished in order to generate a layout for {layout_description}

The text below, combines the prompt above to produce the actual prompt that's sent to the LLM:

Prompt 0: Generate a complete list of tasks that should be accomplished in order to generate a layout for {layout_description}

Given the user's prompt:

Generate a website that enables me to play a trading card game against an ai opponent. {rules}, {game description} and the data object that defines {rules}, {game_description}

What is the value of {layout_description}. Respond only with this value.

Once sent to the LLM via the private interpreter the response is:

"A website that enables users to play a trading card game against an AI opponent."

This value can now be used to update the user's data object 513. It should be noted that while adaptation is not always successful, it can be extremely useful in reducing development time when a best guess is returned to the user. Often the LLM is capable of reliably performing this behavior especially when the match_scores returned from the find_applicable_code/prompt processes.code/prompt processes are significantly high. Further, as more data is added to the database a specialized and dedicated model could be constructed for this task, the current process imagines this action to be performed with the help of an LLM. It will be appreciated that adaptation may not always be required or needed—e.g., in the case of an exact code/prompt processes match.)

1215 This step illustrates the adapted data object and adapted code/prompt processes now returned to the client.

The process so far described in FIG. 12 illustrates an example function of the system that permits the fast search and application of code/prompt processes in the database to a user's code/prompt processes. Core to this is the reframing of the input submitted to the query sub-process so that it mirrors the format of code/prompt processes stored in the database. This facilitates a flexible and effective search functionality.

In certain examples, more sophisticated matching is possible via increased questioning during the transformation phase. Instead of simply asking the LLM to produce a procedure we may ask multiple questions to the LLM about the user's prompt. For example, project an input and project an output for the given prompt/code segment', 'Improve the users prompt adding more detail from a web search on the topic, then produce a procedure'. The sophistication of the transformation step is intended to be one that can scale in its complexity depending on the quality of the response that's requested. Developers can request this level of quality when configuring the interpreter, it can also be automatically applied. The effectiveness of this process is highly dependent on the quality of the initial input, in some cases it may not even be necessary to perform any kind of transformation, especially if the match_score is high enough off the bat for an existing procedure. For example, if the user submitted a prompt "build a website", find_applicable_code/prompt processes.code/prompt processes could send this directly to the encoder and compare it to the database's embeddings to find "generate_a_website", this may yield a high enough match_score that no additional transformation would be necessary. This step may accordingly be preformed prior to performing the transformation step.

In some examples, the process so far describes the matching process centered around the user's first prompt and their input_data, but a similar process may be performed for all aspects of the file that the user needs to construct—e.g., configuration, code, etc. In such cases, existing code/configuration information in the database would be searched for in a similar manner. For example, 'code that will properly clip the html segments out of a response' or 'code that will check for a failed response and perform the re-ask logic', the query process can facilitate a recommendation in these scenarios as well.

In some instances, as the database scales to more and more code/prompt processes (e.g., millions of code/prompt processes) custom neural networks may be trained on the database and natural language processing offer methods of reducing the computational load of embedding comparisons. Queries into the knowledge graph that find the rough segments where useful code/prompt processes may reside reduce the need to perform an exhaustive search across the entire database. These practices are typical of most large-scale search algorithms and a similar tactic would be employed in the system as the database scaled.

In some examples, the process in the figure illustrates the process for the situation where find_applicable_code/prompt processes.code/prompt processes is run remotely, but this may not be desirable in some examples as the demand on the system increases. Increasingly in these scenarios the system code/prompt processes would be distributed to clients along with the interpreter and a configuration that retrieved these from the file system would be employed vs a request to the microservices. In this scenario the reframing/transformation queries may be done locally, and the embedding comparisons done remotely.

Example Code/Prompt Processes Result

The following illustrative code snippet is an example of a code/prompt processes that may returned (e.g., at 222 or 110) to the user in connection with the automatic generation of a card game (e.g., as discussed herein). In the below example, the input field is an example of the data object 313. This may be a dictionary that is carried over with each of the prompts as they are executed.

In the below example, there are a couple of steps in the card game generator that involve multiple code/prompt processes as is. For example, generate_a_card_game uses the website generator to produce a template image for each card. When the execution of the code/prompt processes hits prompt2 it calls an additional code/prompt processes and sends the website_description variable to generate_a_website.

Note that in some examples, if the user submitted a code/prompt process the initially called for generation of a website the system described herein may automatically update the code/prompt processes to incorporate the code/prompt processes for that task that may already exist.

TABLE 1

Example Code/prompt processes Result

```
author: Tyler
input:
  text: A card game about web browsers.
  background: ''
  properties_list: ''
  pseudo_code_example: ''
max_prompts: 10
min_prompts: 4
models: ChatGPT
use_msg_history: true
prompts:
- id: 0
  name: prompt_0
  next: 1
  output: parseRules(output)
  prompt: '{background}. Develop the rules for a trading card game {text}.
  Each player has their own deck of cards and during play each player should have a
deck, a hand, and a number of played cards.
  Played cards should be played face up so that both players can see them.'
- id: 1
  name: prompt_1
  next: 2
  prompt: 'Given the rules of the game: {rules}, and the {background}
  Develop a list of properties that each card will have.
  Each card must have a name on the card, top left of the card.
  A image, top center and padded, taking up the top half of the card.
  2 text blocks should take up the bottom half of the card:
    - A small special attribute section, (text block), padded, should be below the main
image.
    - A lore section, (text block), padded below the special attribute section.
  The padded area of the card should leave enough space for the additional properties.
  Additional properties can be placed anywhere on the card in the padded regions.
  \n\nList all the additional properties on the card, with a description of each.'
  output: save_properties(output)
- id: 2
  name: prompt_2
  use_msg_history: false
  prompt: 'generate_a_website.code/prompt processes(website_description=
  ''Generate a template image (.html) of a card in the game.
  {pseudo_code_example}
  The template card should draw colored shapes (i.e. rectangles, squares, circles,
polygons),
  for each region where a property should be displayed, text should be added to each
region
  indicating what property it represents. All the card properties need to be displayed in
the layout.'')
  Include all the properties relevant to the game: {properties_list}
  Also draw a circle in each corner of the card, center the circle at the card corner
(~radius 20),
  display a property in each of these.
  The top right corner should be slightly larger than the other 3 (i.e. ~radius 40).
  '')
  '
  output: save_html_file(output)
  next: try_again_or_goto_next(output)
- id: 3
  name: prompt_3
  use_msg_history: false
  prompt: '{output_from_step_2}\n\nRe-write the python code or continue it,
  make sure the image takes up the top half of the card, and the text is word wrapped
inside of the shapes
  completing the code to make sure all the properties are added {properties_list}'
  output: save_html_file(output)
```

Figure 13:
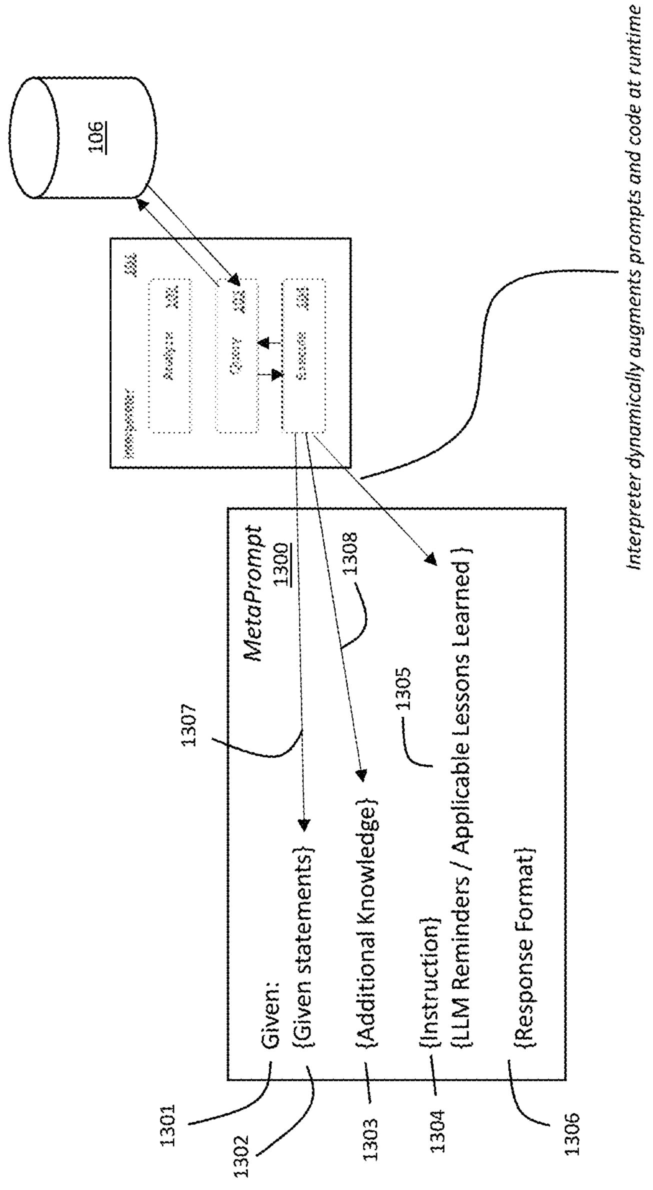
FIG. 13 illustrates how the system manipulates templated prompt structure to deliver on core system functionality.

Description of FIG. 13

FIG. 13, henceforth referred to as a 'MetaPrompt' (1300), is a prompt that may be defined (e.g., solely defined) by its parameters. Thus, as the prompt contains no specific instruction its content can include the structure of these variables. In certain example embodiments, some additional wording may be supplied along with these parameters. For example, "given" statements may be proceeded by 'Given:\n' (1301). In certain example embodiments, to be considered Meta, the prompt must be largely controlled by its corresponding parameter(s).

MetaPrompts, specifically the one illustrated in FIG. 13, may be essential to facilitating many aspects of the system dependably: Re-Use, Adaptation, Creation. The structure (which may be considered relatively simple) enables new prompt sequences with dramatically different functionality to be produced by simply swapping out the parameters of existing sequences. For example, if an existing prompt sequence for generating styles is retrieved from the database with input variables that do not match the input variables the user has on hand, the inputs can be quickly swapped out so that the existing process conforms with the users' requirements (A similar process would happen for associated pre-processing functions, more detail on this in subsequent figures). This can be additionally useful as different prompts from different processes are sequenced to create new processes, because of their componentized nature variable values in bulk.

Given statements 1302 are declarations of those variables that are needed by the prompt. For example, if it was generating html for the given statements might be user description. As mentioned, these are extremely flexible, making it easy to adapt a single instruction to numerous situations without sacrificing functionality. For example, if the process was generating a thumbnail gallery, the given statement might instead be a list of image paths to include in the html.

Additional knowledge 1303 is a section reserved for any external knowledge source. This might contain information from the internet or some external database, it is like given statements but more tied to external data stores, the delineation between the 2 is minor but the compartmentalization again assists re-use and flexibility. In certain example embodiments, in the context of the process running through the interpreter, augmentation to this field may occur dynamically in the course of execution, this is also true for 1305.

Instruction 1304, the root instruction or base command that tells the LLM what it needs to do. For example, 'Generate html for the website', 'Generate the lyrics to the song', 'Generate a helpful reminder for this prompt', the instruction tells the model what to do.

Reminders 1305, inevitably the LLM provides answers that are incorrect, and reminders offer a straightforward way to correct this. For example, if the prompt was 'Given the thumbnails. Generate the html for a website' but each time the LLM generated the html it failed to include the images, a good reminder might be—'Make sure to incorporate the images provided'. In different situations different reminders might apply more than others and depending on the situation the group of active reminders may need to be swapped out for more appropriate ones. The modularity of reminders in the MetaPrompt structure facilitates dynamic swapping of these greatly enhancing reuse in the system. If configured, the interpreter may perform this swapping at runtime, referencing triggers that are stored in the process database and tied to different input and input types. Reminders can also be hard coded should the developer wish to maintain a greater aspect of control around the process. Albeit straightforward reminders offer an excellent way to boost performance across different domains and in challenging circumstances-automatic processes in the system can also generate reminders.

Response format 1306, the response format dictates the expected output format that the LLM will provide. For example. 'Respond ONLY with the tab delimited columns of the table', 'Respond ONLY with html', "Respond ONLY with the following structured json: {'answer': ' . . . ' #your answer goes here, 'thinking': ' . . . ' #your thinking goes here" the response format dictates how the LLM is to respond, almost never is the raw output from the model sought though it certainly can be. In this case, one might not omit the response format or simply include 'Respond'.

It should be noted that FIG. 13 is model agnostic though the more sophisticated the LLM the more the relevant the structure becomes (e.g., less sophisticated LLMs may be unable to provide a meaningful response to this format). The smarter the LLM the better overall the system can perform, as time goes on less and less structure may be needed to elicit proper responses but for now this system and the structure described be these MetaPrompts make possible outputs that are far and away better than any singular base model.

Also illustrated in FIG. 13 is the role the interpreter plays in interacting with a metaprompt. Based on the compartmentalized nature of these prompts the interpreter can (e.g., with ease) adapt existing prompts throughout the execution of a code/prompt process.

Description of FIG. 14

FIG. 14 demonstrates an additional prompting technique used in the system, referred to as a 'FieldPrompt' (1400). This technique enables a large (e.g., double, 5×, or 10× as much) amount of structured output to be produced from a minimal amount of instruction. Minimal instruction (1401) coupled with given statements (1402) and information on each to be generated column (1403, 1404) is provided along with the instruction to fill out the table (1405) and the table headers (1406), a response format 'Respond ONLY with the tab separated table' (1407) is also supplied.

FieldPrompts enable processes like generate_objectives (300) to be accomplished more efficiently in the system. Additional uses include metadata generation, and process_enrichment which assist in find_applicable_process (1301) and generate_procedure (300). To the right of the templated prompt is an Illustration of the results of the FieldPrompt prompting technique for process generation. In the example, a large number of process statements around the topic 'html' are quickly created.

As discussed in FIG. 3 generate_processes (300) is a system process that can be run periodically to populate the database (106) and automatically kick off generate_process runs (301) for each generated process statement. This is useful because the more processes in the database that can be verified and added the more of these can be re-used and the less work it takes to generate new processes. Note the massive amount of output being reliably generated from minimal instruction, the process makes mass production of processes around different topics more efficient. FieldPrompts can also be applied iteratively adding more and more column types in subsequent passes, this can result in a far higher quality output than the base model alone.

Figure 15:
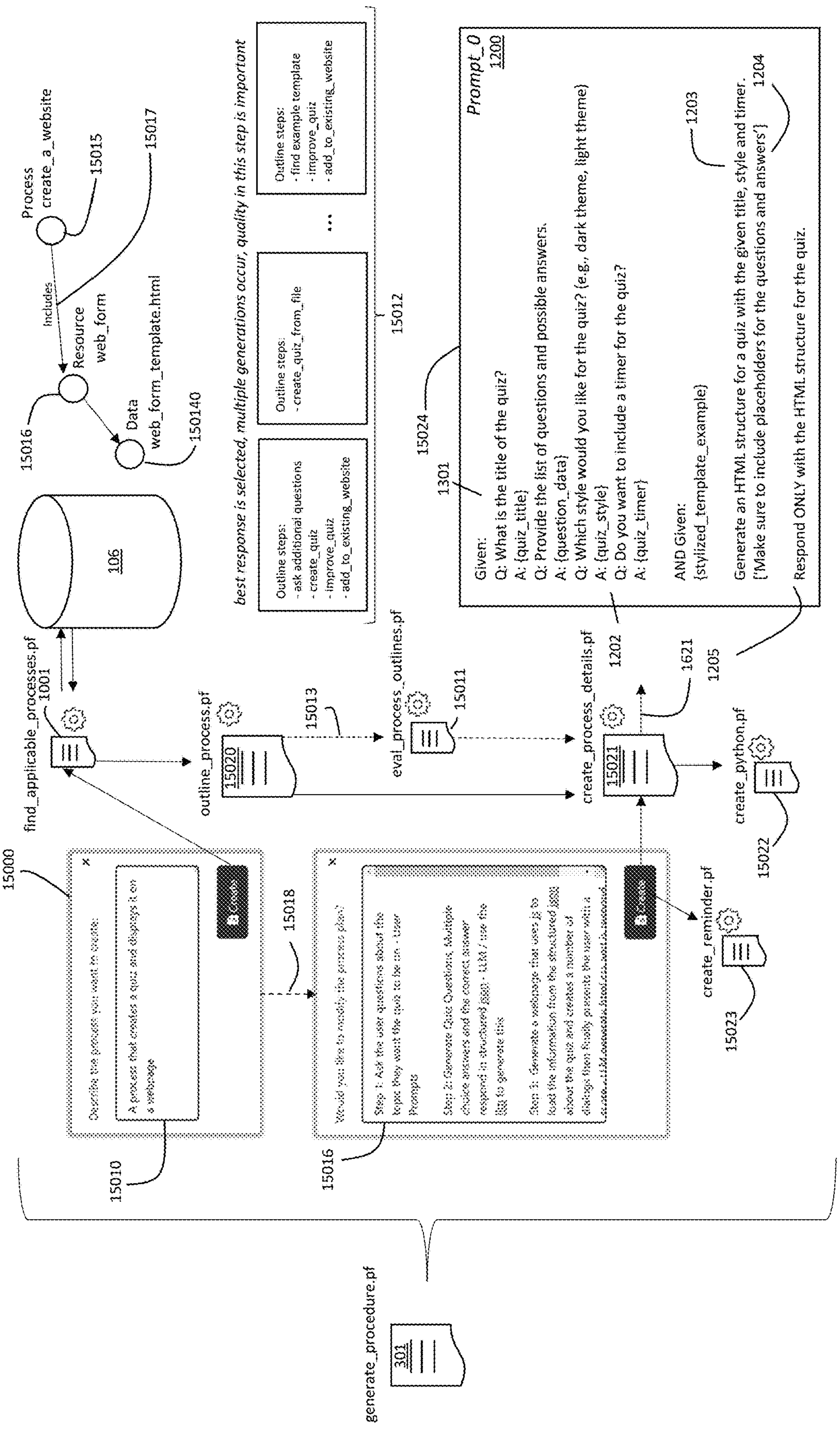
FIG. 15 provides a detailed view of the process creation algorithm.

Description of FIG. 15

FIG. 15 Illustrates a more detailed look at the current implementation of generate_process (301) (which is listed as "generate_procedure.pf" 301 in FIG. 15) that facilitates process creation in the system. There are multiple implementations of this process that are meant to function in either a manual or automatic contexts, algorithms such as those discussed in this diagram focuses on the manual context. The process is triggered by a 'process request' (15010) being sent from the client to the server, generate_processes (301) is then retrieved by the microservices (105) and the user input along with the process are sent to the private interpreter (401) where execution begins.

In a GUI context, process creation for process request 15010 may be triggered by a user describing the process then clicking create. In other instances process request 15010 may be triggered a command line context by invoking the interpreters generate_process command. In either case, a request is made to the server and the microservices (105) handle the request.

Once execution of generate_process begins, the first sub process initiated is find_applicable_processes (1201) which queries the database with the user request for an existing process (see FIG. 10). If a match is found, this process can then be returned and provided directly to the client-forgoing any additional logic, or if a close match is found this process can then be routed to an adapt_process sequence (1212).

In the GUI context, the user may confirm whether they want to use the existing process, adapt it, or create a new one. Similar functionality may be mirrored via command line.

Supposing that no good matches are found, the process request then goes through an enrichment process, where the system generates more information around the process request (1202), these typically include: inputs, outputs, resources and tools, as well as any clarifying questions that need to be asked of the user. If there are clarifying questions, then additional dialogs may occur first then the enrichment_process will be run factoring in these answers and the users process request.

From this generated information searches are run across the database either structurally (via cypher query) or via embedding search (see FIG. 10). It will be appreciated that in certain example embodiments, that the purpose of the search at this stage is not to find exact process matches. Rather, the search may be used to find existing elements and processes (e.g., all such elements and/or processes) in the database that might assist in the generation task.

Following this retrieval, additional dialogs may occur at this point (15018)—the extent of manual interaction here can vary greatly depending on the process type and the specific process request. Note, however, that while this aspect may be automated (e.g., completely by the system), that providing the user finer control over the output at each stage can result in time/effort savings for the overall task. From the users answers to the additional dialogs (15018) multiple runs to find_applicable_processes may be initiated. For example, similar output types (15014), inputs, data (15016), processes (15015) may be retrieved from the process database. In certain examples, groups of historical lessons/LLM Reminders may also be retrieved that can be used to boost performance around different aspects of the creation process.

Once the relevant knowledge/resources are gathered, a rough process plan (an outline) is generated (15020) in this 'process plan' the system outlines the steps involved in the process assigning what tools it thinks are best used for the different steps, LLM/Python/Image Generator/Web search/an existing sub process etc. (15016).

In the GUI context, the user may update this plan, in which case the corrected plan and the original are sent to a create_reminder process (15023) where the system generates an LLM Lesson/Reminder that it stores in the database along with contextual information so it can be re-applied. Now when the user generates a process plan, the historical lessons the LLM learned from the user's previous edits can be used to augment the generate_outline process (15020) better aligning the output with what the user expects. In the context of a GUI, the reminder may be surfaced to the user enabling them to augment the generated reminder before it is stored in the database. Reminders may also be disabled or enabled via settings.

For generate_process to succeed, It is critical that the process plan is accurately constructed and meaningful. If the process plan is incorrect or unhelpful (for example if the LLM recommends pip installing libraries as a step) these errors will compound as the process details are fleshed out resulting in greater costs and greater errors. As such, iteratively generating the process plan and allowing for user augmentation at each stage has the highest probability of success. If the process plan must be generated automatically (15013), an additional process eval_process_outlines (15011) may be added to ensure the highest possible quality output (15012). In FIG. 15, 15012 depicts multiple outlines being generated using generate_outline (15020) followed by the LLM evaluating each outline and selecting the best one. In certain example embodiments, critiquing and re-generation may occur here as well specifically.

It will be appreciated that different techniques may be used in connection with certain example embodiments. For example, there may be multiple algorithms used for generating a process plan.

Once a reliable and comprehensive process plan has been arrived at, the process details can then be generated (15021). create_process_details (15021) is responsible for translating the process plan into the individual prompts and python functions needed at each step of the process. To do this efficiently (e.g., minimize/decrease token cost, having an increased/highest return speed) the specific details at each step are generated by providing the process statement, the process plan, and a heavily commented json structure in a singular prompt that asks for the components and subcomponents of each individual step (e.g., not the complete implementation of the entire process). If the process plan is comprehensive enough, this may transform the exercise into a pure retrieval problem where the LLM is no longer generating novel information but simply re-structuring it into the format required. Once this JSON structure is produced by the LLM, deterministic logic now fully constructs each individual step properly re-formatting the json structure into an execution format that can be understood by the interpreter. (15024) Demonstrates how one of prompts are generated using the MetaPrompt (1300) format. Instead of asking the LLM to produce the complete prompt, the LLM is asked to produce the components of a metaprompt and these are assembled by deterministic logic into a singular prompt which accomplishes the step. This type of approach can result in more efficient processing that can be less prone to error than, for example, directly generating a complete prompt.

Once the individual prompts are generated and the structure of the prompt file (514) is produced, each python function (511, 512) is individually constructed with the details about the function and where it sits in the sequence being provided directly to create_python (15022). The result of create_python is a fully functional python file that contains all the deterministic logic portions needed by the process. Calls to the process database can occur frequently at this stage, preferably existing code is returned and adapted vs generated as this has a higher likelihood of success). It should be noted that the more comprehensive the information is in the database the more likely that the function generation will succeed. Thus, the more extensive the database, the more reliable, faster, and/or cheaper the process can become.

At this point an entirely new functional process will have been constructed. If construction was done in a manual context, then generated files needed for execution by the interpreter will be returned to the user who may make updates to them. In the automatic process, validation and testing may occur and even re-generation (see FIG. 3 for more details). In either case the process generation task has been brought down with a decreased set of interactions—while greatly increasing the speed of new process creation.

It will be appreciated that the algorithm described herein may be adapted as needed. Other types of implementations of generate_process are also envisioned. The exact way in which this algorithm unfolds can vary depending on the capabilities of the underlying base model. For example, the techniques discussed herein are provided with reference to a SOTA LLM circa January 2024. Note that even with a limited set of processes in the database, the process creation algorithm described herein can be effective at generating functional procedures for many tasks, webpage generation, music generation, document generation, textual analysis.

Figure 16:
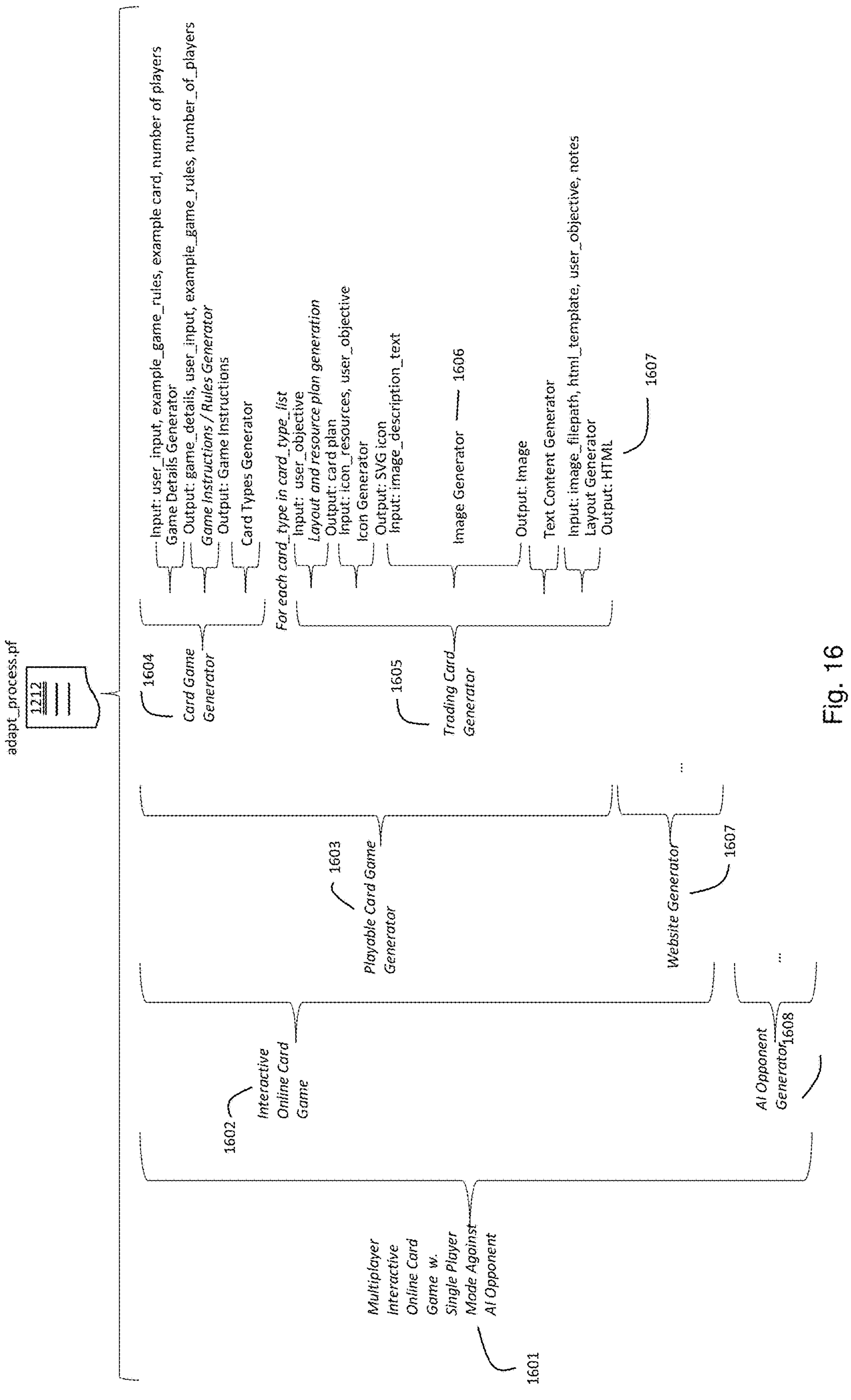
FIG. 16 illustrates how process encapsulation and re-use enables ever more complex code/prompt processes to be produced.

Description of FIG. 16

FIG. 16 illustrates the hierarchical nature of code/prompt processes, higher level processes may inherit lower-level sub processes, and this can easily lead to large amounts of new functionality.

In the diagram, code/prompt processes farthest to the right are the most basic and at each stage these combine with other processes to enable ever more complex functionality.

Starting on the right of the diagram and moving left, Layout Generator (1607) and Image Generator (1606) combine with other smaller processes to form Trading Card Generator (1605). Trading Card Generator (1605) combines with Card Game Generator (1604) to form Playable Card Game Generator (1603). Playable Card Game Generator (1603) combines with Website Generator (1607) to form (1602) Interactive Online Card Game. Interactive Online Card Game (1602) combines with AI Opponent Generator (1608) to form Single player and Multiplayer Interactive Online Card Game (1601).

In the past, inheritance needed to be very rigidly applied via structured languages but in the described system, inheritance can be dynamically as each code/prompt process is easily abstracted to its inputs and outputs. This enables a far more flexible system, where with a relatively small number of processes a great deal of novel capability may emerge.

As has been discussed system processes like (1212) adapt_process.pf perform much of this auto assembly. Because each code/prompt process can be resolved to its inputs and outputs, processes already compartmentalized in a way that enables easy manipulation of their components without overwhelming the context window of an LLM.

Figure 17:
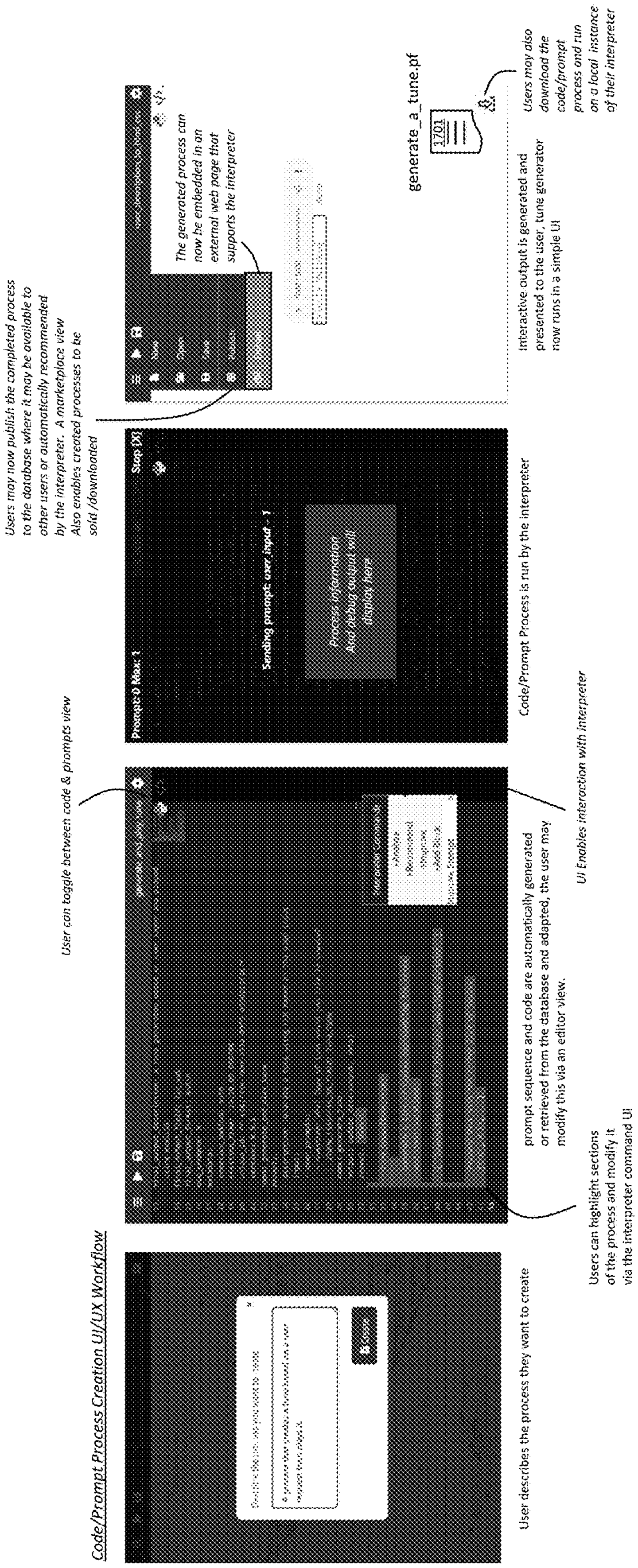
FIG. 17 illustrates an example of process creation working in a web user interface.

Description of FIG. 17

FIG. 17 illustrates the basic process creation workflow that users (e.g., developers, engineers, etc.) might experience via a web UI.

The process starts with the user describing the code/prompt process they want to create, then the interpreter transmits this information to the microservices, and existing code/prompt processes are adapted or generated around the request. Once this adaptation process has finished, a completed code/prompt process will be returned to the user and presented in an editor view. At this stage the developer may provide additional edits, interacting with the interpreter's query/analyze portions to improve different segments of the code or prompt sequence.

When the user is satisfied with their changes, they can run the process in their interpreter. In this specific example this produces an interactive web output for generating a tune based on a user request. At this stage the code/prompt process can either be embedded in other web pages or downloaded and run from a desktop. As has been discussed, other options are available to the developer as well, they may choose to publish this process to the database, in which case the process will undergo a validation pipeline. If it's approved, the process will be accepted to the database where it may be incorporated into future process requests. In certain example embodiments the process may also be posted to a marketplace (and via the web UI).

Figure 18:
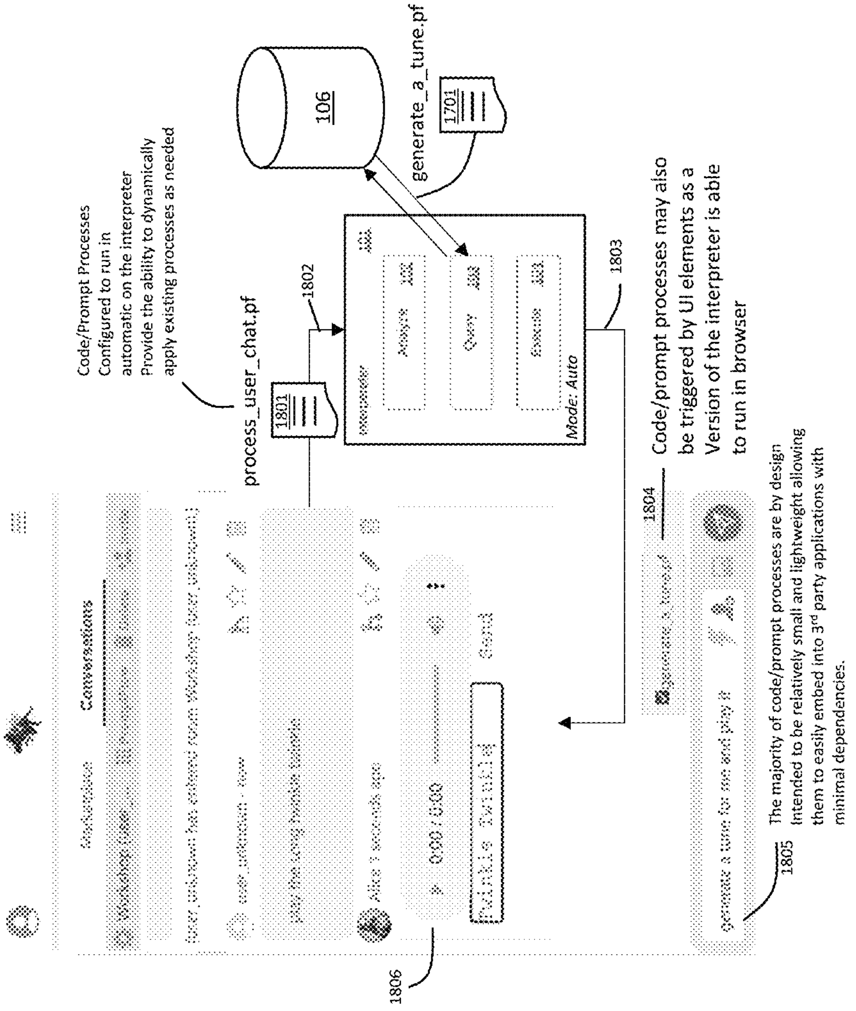
FIG. 18 illustrates an example of code/prompt processes embedded in third party applications.

Description of FIG. 18

FIG. 18 provides some examples of how code/prompt processes may be embedded into third party applications. In FIG. 18, the user is messaging an ai in a chat context. Each message in the conversation is routed through the interpreter (101) at 1802 which runs the code/prompt process 'process_user_chat.pf' (1801). This process engages the automatic mode of the interpreter which queries the database looking for an applicable process before applying it to the response. In specific this example, this results in the code/prompt process "generate_a_tune.pf" (1601) being returned (1803) and input 'twinkle twinkle' being automatically added to the user input dialog (1806).

(1804) Code/Prompt processes may also be directly embedded into applications and triggered on explicit UI events. (1804) Shows an example of how the application might allow enabling and disabling of code/prompt processes especially if they're known ahead of time.

(1805) The majority of code/prompt processes are by design intended to be relatively small and lightweight allowing them to easily embed into $3^{rd}$ party applications with minimal dependencies. 1805 illustrates how even the process to generate_a_process might be engaged via a third party application. This can allow, for example, skipping some or all of the development workflow in FIG. 16 and attempting to provide a complete solution on the fly.

Figure 19:
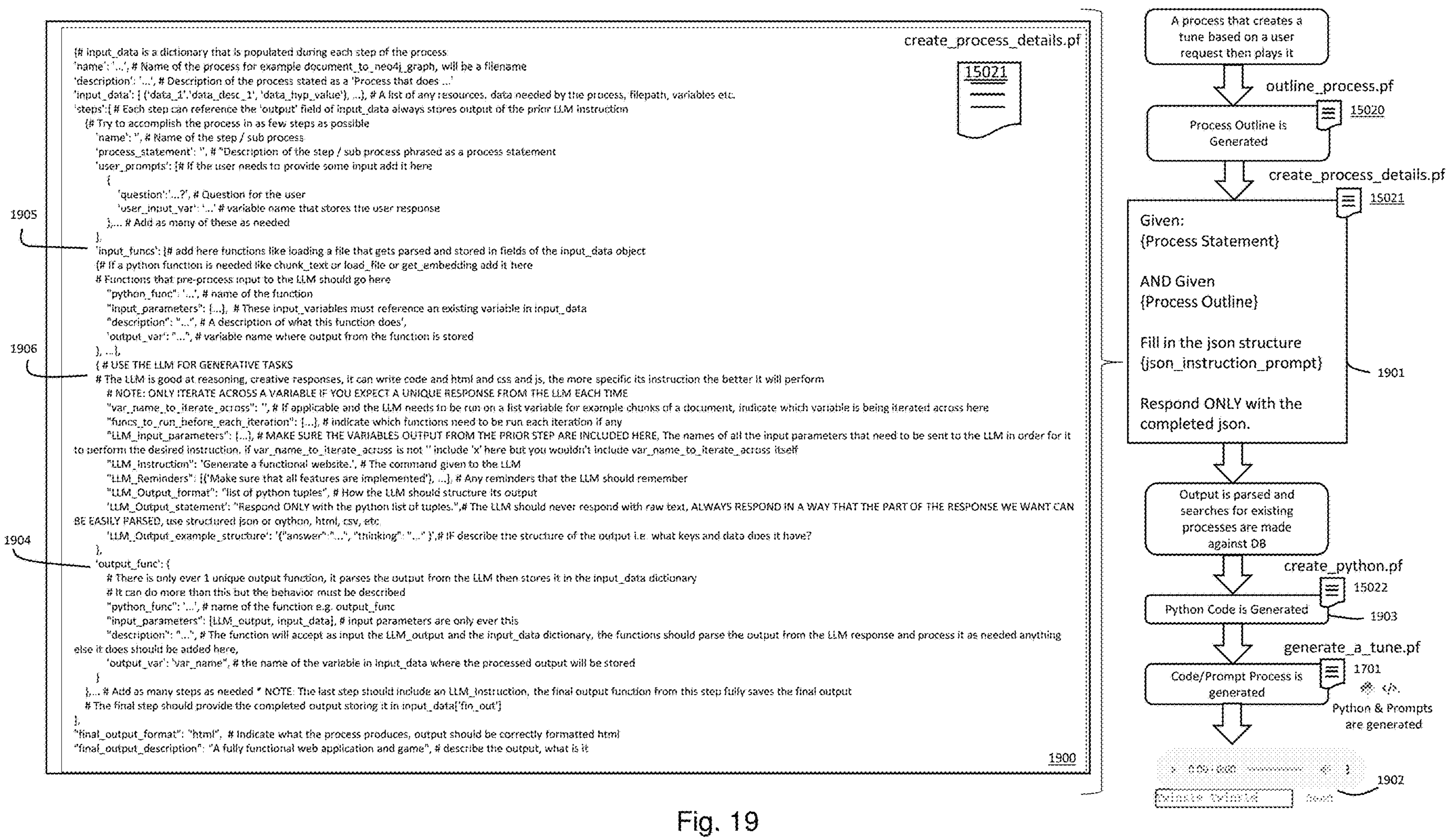
FIG. 19 provides a more detailed view of generate_process_details, an essential step in the auto generation pipeline.

Description of FIG. 19

FIG. 19 provides a more detailed view of the process generation pipeline, specifically the generate process details step. Once the user requests a process to create, an outline of the process is generated (e.g., automatically) and that outline is sent along with the original request to generate_process_details (15021).

(1900) Depicts a prompt (e.g., loaded into the parameter of the 'metaprompt') that performs the bulk of the work at this stage. It will be appreciated that the exact wording and structure of the prompt can be heavily dependent on the model (e.g., the LLM) the prompt is executed against. Data include din prompt 1900 is provided for illustrative purposes to provide a better understanding of the type of instruction(s) that can be used to deliver on the functionality system and techniques described herein.

(1901) Depicts the templated metaprompt that is used by the system to generate the process. It should be noted that the variables for each parameter can change. For example, they may be based on the domain in which the system operates.

To the right side and starting from the top and moving down are each of the stages involved in process creation. Once the process details are generated, the output is parsed and then formed into a set of requests for the process database and code generation. Once all the deterministic logic/code is generated the file is output as both a prompts+configuration file and code file, the structure together forms a prompt/code process. 1902 depicts the result of this process—a new process that accomplishes the user request (in this example to play Twinkle Twinkle).

1904, 1905 denote the parts of the prompt that generate the rough instruction which is used to generate the python functions, both input and output functions are generated by the code/prompt process generate_python.pf (15022).

1906 denotes the section of the prompt that instructs the LLM to construct prompts, rather than the model being asked to produce the complete prompt at once, the task is reframed into generating the individual portions of the prompt. By utilizing the metaprompt structure (1301) these generated fields are then easily assembled into an effective prompt.

Figure 20:
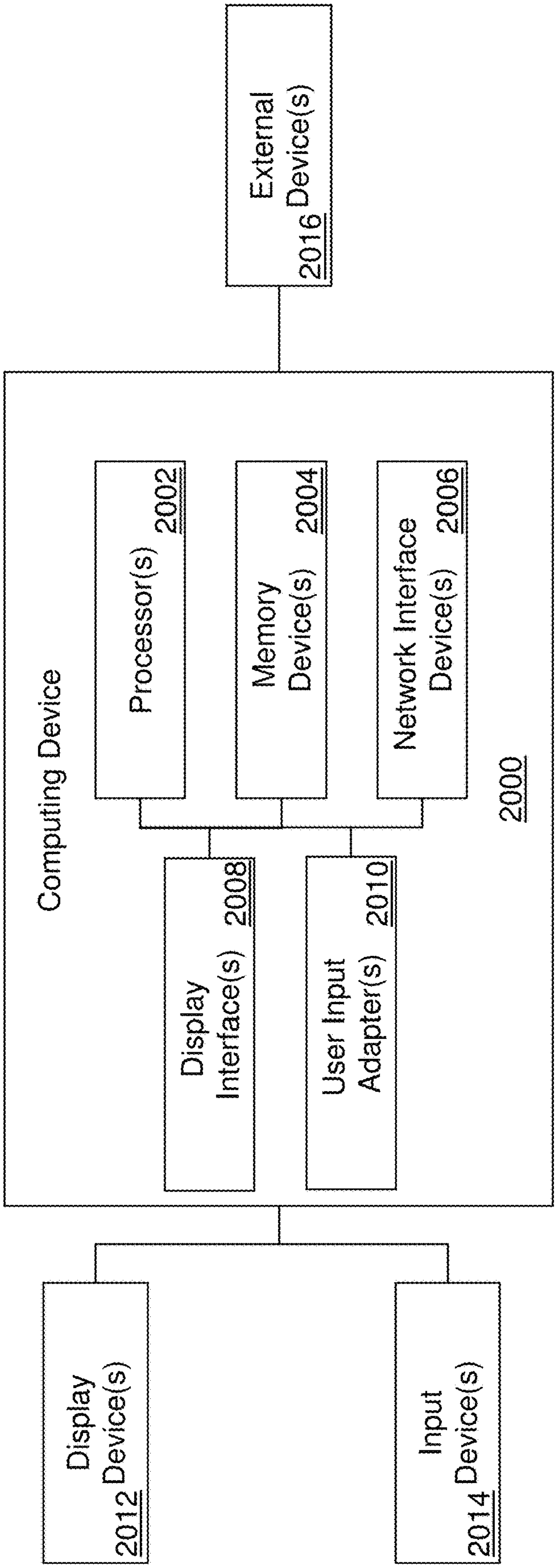
FIG. 20 shows an example computing device that may be used in some embodiments to implement features described herein.

Description of FIG. 20

FIG. 20 is a block diagram of an example computing device 2000 (which may also be referred to, for example, as a "computing device," "computer system," or "computing system") according to some embodiments. In some embodiments, the computing device 2000 includes one or more of the following: one or more processors 2002 (which may be referred to as "hardware processors" or individually as a "hardware processor"); one or more memory devices 2004; one or more network interface devices 2006; one or more display interfaces 2008; and one or more user input adapters 2010. Additionally, in some embodiments, the computing device 2000 is connected to or includes a display device 2012. As will explained below, these elements (e.g., the processors 2002, memory devices 2004, network interface devices 2006, display interfaces 2008, user input adapters 2010, display device 2012) are hardware devices (for example, electronic circuits or combinations of circuits) that are configured to perform various different functions for the computing device 2000. In some embodiments, these components of the computing device 2000 may be collectively referred to as computing resources (e.g., resources that are used to carry out execution of instructions and include the processors (one or more processors 2002), storage (one or more memory devices 2004), and I/O (network interface devices 2006, one or more display interfaces 2008, and one or more user input adapters 2010). In some instances, the term processing resources may be used interchangeably with the term computing resources. In some embodiments, multiple instances of computing device 2000 may arranged into a distributed computing system.

In some embodiments, a computing device 2000 may communicate with external device(s) 2016. External devices 2016 may include other instances of computing device 2000. In some embodiments, external device(s) may be external models, such as an external LLM or other type of model. External device(s) may be dedicated hardware resources and/or may be a cloud-based computing environment. In some examples, external devices may provide additional and/or alternative services to computing device 2000. For example, external device(s) 2016 may be (or host) a computer process that executes a compiler, assembler, interpreter or the like that can take, for example, source code, and return a compiled executable.

In some embodiments, each or any of the processors 2002 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 2002 uses an instruction set architecture such as x86 or Advanced RISC Machine (ARM).

In some embodiments, each or any of the memory devices 2004 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 2002). Memory devices 2004 are examples of non-transitory computer-readable storage media.

In some embodiments, each or any of the network interface devices 2006 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.20), GSM, CDMA2000, UMTS, LTE, LTE-Advanced (LTE-A), LTE Pro, Fifth Generation New Radio (5G NR) and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, data is communicated over an electronic data network. An electronic data network includes implementations where data is communicated from one computer process space to computer process space and thus may include, for example, inter-process communication, pipes, sockets, and communication that occurs via direct cable, cross-connect cables, fiber channel, wired and wireless networks, and the like. In certain examples, network interface devices 2006 may include ports or other connections that enable such connections to be made and communicate data electronically among the various components of a distributed computing system.

In some embodiments, each or any of the display interfaces 2008 is or includes one or more circuits that receive data from the processors 2002, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 2012, which displays the image data. Alternatively, or additionally, in some embodiments, each or any of the display interfaces 2008 is or includes, for example, a video card, video adapter, or graphics processing unit (GPU).

In some embodiments, each or any of the user input adapters 2010 is or includes one or more circuits that receive and process user input data from one or more user input devices 2014 that are included in, attached to, or otherwise in communication with the computing device 2000, and that output data based on the received input data to the processors 2002. Alternatively, or additionally, in some embodiments each or any of the user input adapters 2010 is or includes, for example, a PS/2 interface, a USB interface, a touchscreen controller, or the like; and/or the user input adapters 2010 facilitates input from user input devices 2014 such as, for example, a keyboard, mouse, trackpad, touchscreen, etc.

In some embodiments, the display device 2012 may be a Liquid Crystal Display (LCD) display, Light Emitting Diode (LED) display, or other type of display device. In embodiments where the display device 2012 is a component of the computing device 2000 (e.g., the computing device and the display device are included in a unified housing), the display device 2012 may be a touchscreen display or non-touchscreen display. In embodiments where the display device 2012 is connected to the computing device 2000 (e.g., is external to the computing device 2000 and communicates with the computing device 2000 via a wire and/or via wireless communication technology), the display device 2012 is, for example, an external monitor, projector, television, display screen, etc.

In various embodiments, the computing device 2000 includes one, or two, or three, four, or more of each or any of the above-mentioned elements (e.g., the processors 2002, memory devices 2004, network interface devices 2006, display interfaces 2008, and user input adapters 2010). Alternatively, or additionally, in some embodiments, the computing device 2000 includes one or more of: a processing system that includes the processors 2002; a memory or storage system that includes the memory devices 2004; and a network interface system that includes the network interface devices 2006. Alternatively, or additionally, in some embodiments, the computing device 2000 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 2002 and the network interface devices 2006; or the single SoC (or the multiple SoCs) may include the processors 2002, the network interface devices 2006, and the memory devices 2004; and so on. The computing device 2000 may be arranged in some embodiments such that: the processors 2002 include a multi or single-core processor; the network interface devices 2006 include a first network interface device (which implements, for example, WiFi, Bluetooth, NFC, etc.) and a second network interface device that implements one or more cellular communication technologies (e.g., 3G, 4G LTE, CDMA, etc.); the memory devices 2004 include RAM, flash memory, or a hard disk. As another example, the computing device 2000 may be arranged such that: the processors 2002 include two, three, four, five, or more multi-core processors; the network interface devices 2006 include a first network interface device that implements Ethernet and a second network interface device that implements WiFi and/or Bluetooth; and the memory devices 2004 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the system 50, interpreter 101, analyze 102, query 103, execute 104, microservices 105, database(s) 106, private interpreter 401, and protected interpreter 405, each of which will be referred to individually for clarity as a "component" for the remainder of this paragraph, are implemented using an example of the computing device 2000 of FIG. 20. In such embodiments, the following applies for each component: (a) the elements of the 2000 computing device 2000 shown in FIG. 20 (e.g., the one or more processors 2002, one or more memory devices 2004, one or more network interface devices 2006, one or more display interfaces 2008, and one or more user input adapters 2010), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 2004 (e.g., in various embodiments, in a volatile memory device such as a RAM or an instruction register and/or in a non-volatile memory device such as a flash memory or hard disk) and all actions described herein as performed by the software modules are performed by the processors 2002 in conjunction with, as appropriate, the other elements in and/or connected to the computing device 2000 (e.g., the network interface devices 2006, display interfaces 2008, user input adapters 2010, and/or display device 2012); (c) alternatively or additionally, to the extent it is described herein that the component processes and/or otherwise handles data, in some embodiments, such data is stored in the memory devices 2004 (e.g., in some embodiments, in a volatile memory device such as a RAM and/or in a non-volatile memory device such as a flash memory or hard disk) and/or is processed/handled by the processors 2002 in conjunction, as appropriate, the other elements in and/or connected to the computing device 2000 (e.g., the network interface devices 2006, display interfaces 2008, user input adapters 2010, and/or display device 2012); (d) alternatively or additionally, in some embodiments, the memory devices 2002 store instructions that, when executed by the processors 2002, cause the processors 2002 to perform, in conjunction with, as appropriate, the other elements in and/or connected to the computing device 2000 (e.g., the memory devices 2004, network interface devices 2006, display interfaces 2008, user input adapters 2010, and/or display device 2012), each or any combination of actions described herein as performed by the component and/or by any software modules described herein as included within the component.

The hardware configurations shown in FIG. 20 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 20, (e) via other hardware arrangements, architectures, and configurations, and/or via combinations of the technology described in (a) through (e).

Technical Advantages of Described Subject Matter

In certain example embodiments, a centralized repository for sequence(s) of prompts and code (e.g., collectively a code/prompt process) are provided in a database. Data stored in the database provides independent verification of the effectiveness of a code/prompt processes and prohibits redundant and unsuccessful code/prompt processes from being persisted. This allows for a more reliable repository to be generated that developers can then depend on to build more complicated infrastructure.

In certain example embodiments, a smart interpreter can analyze a code/prompt process and dynamically retrieve/apply existing code/prompt processes to eliminate parts of a code/prompt process that are determined to have a low probability of success. In some instances, the smart interpreter allows for replacing certain elements where there is a more efficient configuration. This results in efficiency gains by saving a developer time and enables developers to construct more efficient code/prompt processes that may have decreased level of interaction with one or more models (e.g., LLMs or the like).

In certain example embodiments, automatic code/prompt processes construction performed by the microservice populates the database with a repository of useful tools that developers can use/iterate on and boost the overall capability of the system.

In certain example embodiments, a system that produces code/prompt processes via minimal instruction—e.g., such as an initial process statement and/or loose outline. For example, "generate a card" or "play a song", and the like.

In certain example embodiments, a system that extends the capabilities of connected neural networks/models is provided by producing pipelined logic sequences that add capability not present in the underlying model.

In certain example embodiments, a system that utilizes a file format which encapsulates each prompt in a sequence along with relevant programming logic (e.g., in terms of input functions that modify the prompt before it is transmitted, along with output functions that parse and re-handle the output). This approach advantageously allows for standardizing code/prompt processes into more clearly defined steps (e.g., logical blocks) that can be leveraged and reconfigured for future use.

In certain example embodiments, a system that utilizes a metaprompt structure is provided. The metaprompt techniques described herein allow for dynamically augmenting user prompts and/or existing prompt sequences to thereby more easily generate further prompts.

In certain example embodiments, a system that can quickly produce functionality in multiple domains without relying of a large amount of manual intervention.

In certain example embodiments, a system that utilizes a pre-loaded suite of code/prompt processes stored in a process graph that enables overall system functionality (e.g., validation, adaptation, generation, and the like).

In certain example embodiments, a system enabled by code/prompt processes that produce code/prompt processes with increased efficiency.

In certain example embodiments, a system that permits monetary compensation for owners of code/prompt processes each time an authored code/prompt process is re-used.

In certain example embodiments, a system that generates a process graph that includes step-by-step instruction that may reconfigure graph structure to produce novel functionality.

In certain example embodiments, the techniques herein allow for accelerating code/prompt process construction as more code/prompt processes are added. Accordingly, relevant code/prompt process may be developed more quickly as additional code/prompt processes are added to a database.

In certain example embodiments, a technical advantage of the techniques described herein is in the generative process capability. The techniques allow for the system to rapidly produces code/prompt processes.

In certain example embodiments, the techniques provide a templated language/file format that couples a sequence of prompts for an LLM with code and configuration information. This allows creating a reduced representation of a complex execution flow that can compactly describe interaction with an LLM thereby enabling effective pipelines to be quickly constructed and abstracted.

In certain example embodiments, the techniques provide a templated language that can call multiple models and systems heavily modifying the input at each stage enables the creation of complex output that the underlying models cannot directly provide.

In certain example embodiments, the techniques provide a database that persists successful sequence prompt/code pipelines and caches output to thereby provide the advantage of future pipelines being better designed and more capable while also facilitating a decrease in a number of model interactions.

In certain example embodiments, the techniques provide an Interpreter that manages model(s) interaction and processes sequence prompts/code while querying a database of historical pipelines and applying them as needed to reduce the model interactions and thereby increase the likelihood of success of an input pipeline.

In certain example embodiments, the techniques provide an interpreter that performs runtime analysis on a provided prompt sequence/code; and generates at least one recommendation that includes an historical prompt sequence/code to thereby provide a tool for developers to more reliably construct complex applications.

In certain example embodiments, the techniques provide an interpreter that executes a scriptable pipeline which can transmit data and communicate with a microservice that runs externally to facilitate the execution of both private and public pipelines.

In certain example embodiments, the techniques provide a microservice. The microservice can perform independent verification/validation of pipelines establishing statistics and probabilistic models that describe the pipelines performance to thereby provide a reliable independent authority for assessing pipeline effectiveness. The microservice can perform continuous promotion of reliable prompt pipelines and/or creating a database of effective tools that can be reliably re-used and not overwhelm with unnecessary duplication. The microservice can enable decomposition of existing pipelines into extensible components to increase the utility of existing pipelines and increase the effectiveness of newly submitted pipelines. The microservice can automatically identify areas where pipelines may be needed creates a list for developers to focus on. The microservice can use the sequence prompts/code/configuration information in the database to construct new sequence prompts/code/configuration information to thereby create an expanding database of processes, tools, resources and 'know how' which can be applied to future process creation.

In certain example embodiments, a system is provided that in which configuration information of a data structure governs how the input and output to/from an LLM are handled at each stage (for each prompt). Based on the output generated by the LLM, the data structure is modified to thereby produce highly variable and dynamic pipelines. The system can execute an interpreter (e.g., interpreter processor) to process the data structure in connection with interaction with the LLM and subsequent modification of the data structure to thereby decrease unnecessary prompting and filling in the gaps of model capability.

Selected Terminology

As used herein, the term LLM or large language model, includes other types of models. Accordingly, whenever it is mentioned herein that an LLM may be prompted, other types of models may also be prompted. The models may be neural networks or other types of machine-learned models that provide an output (e.g., a predictive output) from a given input. When prompted, inference may be performed on the indicated model (e.g., the LLM) that then provides a response.

The elements described in this document include actions, features, components, items, attributes, and other terms. Whenever it is described in this document that a given element is present in "some embodiments," "various embodiments," "certain embodiments," "certain example embodiments, "some example embodiments," "an exemplary embodiment," "an example," "an instance," "an example instance," or whenever any other similar language is used, it should be understood that the given element is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an", and "the" should be read as meaning "at least one," "one or more," or the like; the term "example", which may be used interchangeably with the term embodiment, is used to provide examples of the subject matter under discussion, not an exhaustive or limiting list thereof; the terms "comprise" and "include" (and other conjugations and other variations thereof) specify the presence of the associated listed elements but do not preclude the presence or addition of one or more other elements; and if an element is described as "optional," such description should not be understood to indicate that other elements, not so described, are required.

As used herein, the term "non-transitory computer-readable storage medium" includes a register, a cache memory, a ROM, a semiconductor memory device (such as D-RAM, S-RAM, or other RAM), a magnetic medium such as a flash memory, a hard disk, a magneto-optical medium, an optical medium such as a CD-ROM, a DVD, or Blu-Ray Disc, or other types of volatile or non-volatile storage devices for non-transitory electronic data storage. The term "non-transitory computer-readable storage medium" does not include a transitory, propagating electromagnetic signal.

The claims are not intended to invoke means-plus-function construction/interpretation unless they expressly use the phrase "means for" or "step for." Claim elements intended to be construed/interpreted as means-plus-function language, if any, will expressly manifest that intention by reciting the phrase "means for" or "step for"; the foregoing applies to claim elements in all types of claims (method claims, apparatus claims, or claims of other types) and, for the avoidance of doubt, also applies to claim elements that are nested within method claims. Consistent with the preceding sentence, no claim element (in any claim of any type) should be construed/interpreted using means plus function construction/interpretation unless the claim element is expressly recited using the phrase "means for" or "step for."

Whenever it is stated herein that a hardware element (e.g., a processor, a network interface, a display interface, a user input adapter, a memory device, or other hardware element), or combination of hardware elements, is "configured to" perform some action, it should be understood that such language specifies a physical state of configuration of the hardware element(s) and not mere intended use or capability of the hardware element(s). The physical state of configuration of the hardware elements(s) fundamentally ties the action(s) recited following the "configured to" phrase to the physical characteristics of the hardware element(s) recited before the "configured to" phrase. In some embodiments, the physical state of configuration of the hardware elements may be realized as an application specific integrated circuit (ASIC) that includes one or more electronic circuits arranged to perform the action, or a field programmable gate array (FPGA) that includes programmable electronic logic circuits that are arranged in series or parallel to perform the action in accordance with one or more instructions (e.g., via a configuration file for the FPGA). In some embodiments, the physical state of configuration of the hardware element may be specified through storing (e.g., in a memory device) program code (e.g., instructions in the form of firmware, software, etc.) that, when executed by a hardware processor, causes the hardware elements (e.g., by configuration of registers, memory, etc.) to perform the actions in accordance with the program code.

A hardware element (or elements) can therefore be understood to be configured to perform an action even when the specified hardware element(s) is/are not currently performing the action or is not operational (e.g., is not on, powered, being used, or the like). Consistent with the preceding, the phrase “configured to” in claims should not be construed/interpreted, in any claim type (method claims, apparatus claims, or claims of other types), as being a means plus function; this includes claim elements (such as hardware elements) that are nested in method claims.

Additional Applications of Described Subject Matter

Additional include having the database created by both automatic processes and user created pipelines. This can create an interesting opportunity for further expansion of any underlying model’s capability. The techniques discussed herein allow for providing an excellent source of training data that could be exploited by future AI models when the database is populated by a sufficiently large number of code/prompt processes.

Although process steps, algorithms, or the like, including without limitation with reference to FIGS. 2-4, 9, and 10, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A system for abstracting, re-using, and dynamically applying code/prompt sequences, the system comprising:

a non-transitory computer-readable storage medium configured to store a database of existing code/prompt processes, associated metadata, and representative embeddings; and at least one hardware processor configured to perform operations comprising:

receiving a user input from a user for a code/prompt process data structure, wherein the code/prompt process data structure includes: 1) a plurality of prompts that are executable against one or more neural networks, and 2) a plurality of logical code segments;

executing an interpreter process using the code/prompt process data structure received from the user;

generating at least a first prompt based on modifying at least one prompt of the plurality of prompts using at least one logical code segment of the plurality of logical code segments;

executing at least the first prompt against an external model;

receiving, based on the execution of the first prompt against the external model, a responsive output;

generating an augmented output based on modifying the responsive output using at least one logical code segment of the plurality of logical code segments;

generating an embedding based on at least in part on the augmented output;

executing a find process to perform, against the database and using the embedding, a search operation to retrieve at least one existing code/prompt process of the existing code/prompt processes;

adapting the at least one existing code/prompt process of the existing code/prompt processes into an executing code/prompt process to generate a modified version of the at least one existing code/prompt process of the existing code/prompt processes; and continue executing the interpreter process with the modified version of the at least one existing code/prompt process of the existing code/prompt processes and returning an execution result of the modified version of the at least one existing code/prompt process of the existing code/prompt processes to the user.

2. The system of claim 1, wherein the interpreter process executes a plurality of different segments of the code/prompt process data structure, and wherein each different segment of the plurality of different segments of the code/prompt process data structure includes at least one prompt of the plurality of prompts and corresponding logical code segment of the plurality of logical code segments.

3. The system of claim 1, wherein the code/prompt process data structure includes a persistent data object that is updated based on execution of the interpreter process.

4. The system of claim 3, wherein the persistent data object is updated in connection with each logical code segment of the plurality of logical code segments.

5. The system of claim 1, wherein the operations further comprise:

generating the existing code/prompt processes by executing one or more protected interpreter processes.

6. A method of operating a computer system by allowing user interaction with the computer system by providing a light instruction to an interpreter process in the form of a process request and/or other input data, the method comprising:

receiving, at a client interpreter process and from a user, a user input and a process request;

generating a query that is based on the process request received from the user and communicating the query to a microservice;

executing the microservice to interact with a remote private interpreter process which runs a find/adapt code/prompt process against one or more neural networks;

executing a find process to perform a first search operation for relevant existing code/prompt processes;

based on the first search operation failing to find an exact match for the relevant existing code/prompt processes, executing an adaptation process that assembles code/prompt processes returned by a second search operation into a new process that meets the process request received from the user and generates steps in the new process that are identified as missing in the new process;

returning the adaptation process to the client interpreter process for execution; and executing the adaptation process by the client interpreter process and returning an execution result of the adaptation process to the user.

7. The method of claim 6, wherein the first and/or second search operation is performed using at least one of keywords, embeddings, and/or model inference.

8. The method of claim 7, wherein the first and/or second search operation is performed using at least two of keywords, embeddings, and/or model inference.

* * * * *